(12) United States Patent
Oda et al.

(10) Patent No.: US 11,776,339 B2
(45) Date of Patent: Oct. 3, 2023

(54) CONTROL SYSTEM, CONTROL METHOD, AND COMPUTER READABLE MEDIUM FOR OPENING AND CLOSING A SECURITY GATE

(71) Applicant: TOYOTA JIDOSHA KABUSHIKI KAISHA, Toyota (JP)

(72) Inventors: Shiro Oda, Anjo (JP); Tetsuya Taira, Nagakute (JP); Satoshi Toyoshima, Okazaki (JP); Yuta Watanabe, Toyota (JP); Takeshi Matsui, Nisshin (JP); Takayoshi Nasu, Okazaki (JP); Kei Yoshikawa, Nagoya (JP); Yusuke Ota, Nagakute (JP); Yutaro Ishida, Toyota (JP); Yuji Onuma, Nagoya (JP); Kyosuke Arai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 120 days.

(21) Appl. No.: 17/545,350

(22) Filed: Dec. 8, 2021

(65) Prior Publication Data
US 2022/0262183 A1 Aug. 18, 2022

(30) Foreign Application Priority Data
Feb. 16, 2021 (JP) .................................. 2021-022227

(51) Int. Cl.
*G07C 9/15* (2020.01)
*G07C 9/38* (2020.01)
*G05D 1/02* (2020.01)
*G06Q 10/08* (2023.01)
*G07C 9/32* (2020.01)

(52) U.S. Cl.
CPC ............. *G07C 9/15* (2020.01); *G05D 1/0217* (2013.01); *G05D 1/0291* (2013.01); *G06Q 10/08* (2013.01); *G07C 9/32* (2020.01); *G07C 9/38* (2020.01); *G05D 2201/0216* (2013.01)

(58) Field of Classification Search
CPC ............. G06Q 10/08; G07C 9/32; G07C 9/38
See application file for complete search history.

(56) References Cited

U.S. PATENT DOCUMENTS

| | | | |
|---|---|---|---|
| 2020/0117193 A1* | 4/2020 | Zhou | G08G 1/005 |
| 2021/0228010 A1 | 7/2021 | Tazume | |
| 2022/0214686 A1* | 7/2022 | Cole | H04W 4/80 |

FOREIGN PATENT DOCUMENTS

| | | |
|---|---|---|
| JP | 2019108219 A | 7/2019 |
| JP | 2019130616 A | 8/2019 |
| JP | 6782387 B1 | 10/2020 |

* cited by examiner

*Primary Examiner* — Daniell L Negron
(74) *Attorney, Agent, or Firm* — Dickinson Wright, PLLC

(57) ABSTRACT

A control system that controls opening-closing of a security gate which is provided in a facility in which a plurality of mobile robots travels autonomously is provided. The control system performs: receiving a passing-through reservation signal for passing through the security gate; and allowing a plurality of mobile robots to consecutively pass through the security gate while the security gate opens its gate once when passing-through reservation signals are received from the plurality of mobile robots.

18 Claims, 20 Drawing Sheets

CONTROL SYSTEM, CONTROL METHOD, AND COMPUTER READABLE MEDIUM FOR OPENING AND CLOSING A SECURITY GATE

CROSS-REFERENCE TO RELATED APPLICATION

This application claims priority to Japanese Patent Application No. 2021-022227 filed on Feb. 16, 2021, incorporated herein by reference in its entirety.

BACKGROUND

1. Technical Field

The present disclosure relates to a control system, a control method, and a program.

2. Description of Related Art

Japanese Unexamined Patent Application Publication No. 2019-108219 (JP 2019-108219 A) discloses a delivery system that delivers a delivery object using an unmanned delivery vehicle (a delivery robot) in an apartment. Here, authentication information for permission to pass through a gate of the apartment is stored in the unmanned delivery vehicle. When the unmanned delivery vehicle transmits the authentication information to an apartment server, the unmanned delivery vehicle can pass through the gate.

SUMMARY

When a plurality of delivery robots (also referred to as mobile robots) is controlled, there is demand for allowing the mobile robots to move more efficiently. For example, it is preferable to perform control such that the plurality of mobile robots efficiently passes through a gate.

The present disclosure provides a control system, a control method, and a program that can appropriately control passing through a security gate.

According to an embodiment, there is provided a control system that controls opening-closing of a security gate which is provided in a facility in which a plurality of mobile robots travels autonomously, the control system performing: receiving a passing-through reservation signal for passing through the security gate; and allowing a plurality of mobile robots to consecutively pass through the security gate while the security gate opens its gate once when passing-through reservation signals are received from the plurality of mobile robots.

In the control system, the passing-through order in which the plurality of mobile robots passes through the security gate may be determined based on a predetermined priority.

In the control system, it may be determined whether the plurality of mobile robots has consecutively passed through the security gate in the order in which the passing-through reservation signals have been received.

In the control system, each mobile robot may transmit the passing-through reservation signal when a moving time or a moving distance from the mobile robot to the security gate is equal to or less than a predetermined value.

In the control system, each mobile robot may transmit the passing-through reservation signal when the mobile robot has moved to a predetermined position in the facility.

In the control system, each mobile robot may transmit a passing-through start signal when the mobile robot has arrived at the security gate, and control may be performed such that the gate of the security gate is opened in accordance with the passing-through start signal.

In the control system, each mobile robot may transmit a passing-through completion signal indicating that passing through the security gate has been completed, the security gate may allow a first mobile robot and a second mobile robot to consecutively pass through the gate when the gate is being opened once when the passing-through reservation signal from the second mobile robot is received before the passing-through completion signal from the first mobile robot is received, and the security gate may close the gate before the second mobile robot passes through the gate after the first mobile robot has passed through the gate when the passing-through reservation signal from the second mobile robot is not received before the passing-through completion signal from the first mobile robot is received.

According to another embodiment, there is provided a control method of controlling opening-closing of a security gate which is provided in a facility in which a plurality of mobile robots travels autonomously, the control method including: receiving a passing-through reservation signal for passing through the security gate; and allowing a plurality of mobile robots to consecutively pass through the security gate while the security gate opens its gate once when passing-through reservation signals are received from the plurality of mobile robots.

In the control method, the passing-through order in which the plurality of mobile robots passes through the security gate may be determined based on a predetermined priority.

In the control method, it may be determined whether the plurality of mobile robots has consecutively passed through the security gate in the order in which the passing-through reservation signals have been received.

In the control method, each mobile robot may transmit the passing-through reservation signal when a moving time or a moving distance from the mobile robot to the security gate is equal to or less than a predetermined value.

In the control method, each mobile robot may transmit the passing-through reservation signal when the mobile robot has moved to a predetermined position in the facility.

In the control method, each mobile robot may transmit a passing-through start signal when the mobile robot has arrived at the security gate, and control may be performed such that the gate of the security gate is opened in accordance with the passing-through start signal.

In the control method, each mobile robot may transmit a passing-through completion signal indicating that passing through the security gate has been completed, the security gate may allow a first mobile robot and a second mobile robot to consecutively pass the gate when the gate is being opened once when the passing-through reservation signal from the second mobile robot is received before the passing-through completion signal from the first mobile robot is received, and the security gate may close the gate before the second mobile robot passes through the gate after the first mobile robot has passed through the gate when the passing-through reservation signal from the second mobile robot is not received before the passing-through completion signal from the first mobile robot is received.

According to another embodiment, there is provided a program causing a computer to perform a control method of controlling opening-closing of a security gate which is provided in a facility in which a plurality of mobile robots travels autonomously, the control method including: receiving a passing-through reservation signal for passing through the security gate; and allowing a plurality of mobile robots to consecutively pass through the security gate while the security gate opens its gate once when passing-through reservation signals are received from the plurality of mobile robots.

In the program, the passing-through order in which the plurality of mobile robots passes through the security gate may be determined based on a predetermined priority.

In the program, it may be determined whether the plurality of mobile robots has consecutively passed through the security gate in the order in which the passing-through reservation signals have been received.

In the program, each mobile robot may transmit the passing-through reservation signal when a moving time or a moving distance from the mobile robot to the security gate is equal to or less than a predetermined value.

In the program, each mobile robot may transmit the passing-through reservation signal when the mobile robot has moved to a predetermined position in the facility.

In the program, each mobile robot may transmit a passing-through start signal when the mobile robot has arrived at the security gate, and control may be performed such that the gate of the security gate is opened in accordance with the passing-through start signal.

In the program, each mobile robot may transmit a passing-through completion signal indicating that passing through the security gate has been completed, the security gate may allow a first mobile robot and a second mobile robot to consecutively pass through the gate when the gate is being opened once when the passing-through reservation signal from the second mobile robot is received before the passing-through completion signal from the first mobile robot is received, and the security gate may close the gate before the second mobile robot passes through the gate after the first mobile robot has passed through the gate when the passing-through reservation signal from the second mobile robot is not received before the passing-through completion signal from the first mobile robot is received.

According to the present disclosure, it is possible to provide a control system, a control method, and a program that can appropriately control passing through a security gate.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the disclosure will be described, but the disclosure described in the appended claims is not limited to the following embodiment. All elements described in the following embodiment are not necessary for a configuration according to the disclosure.

Configuration Outline

Figure 1:
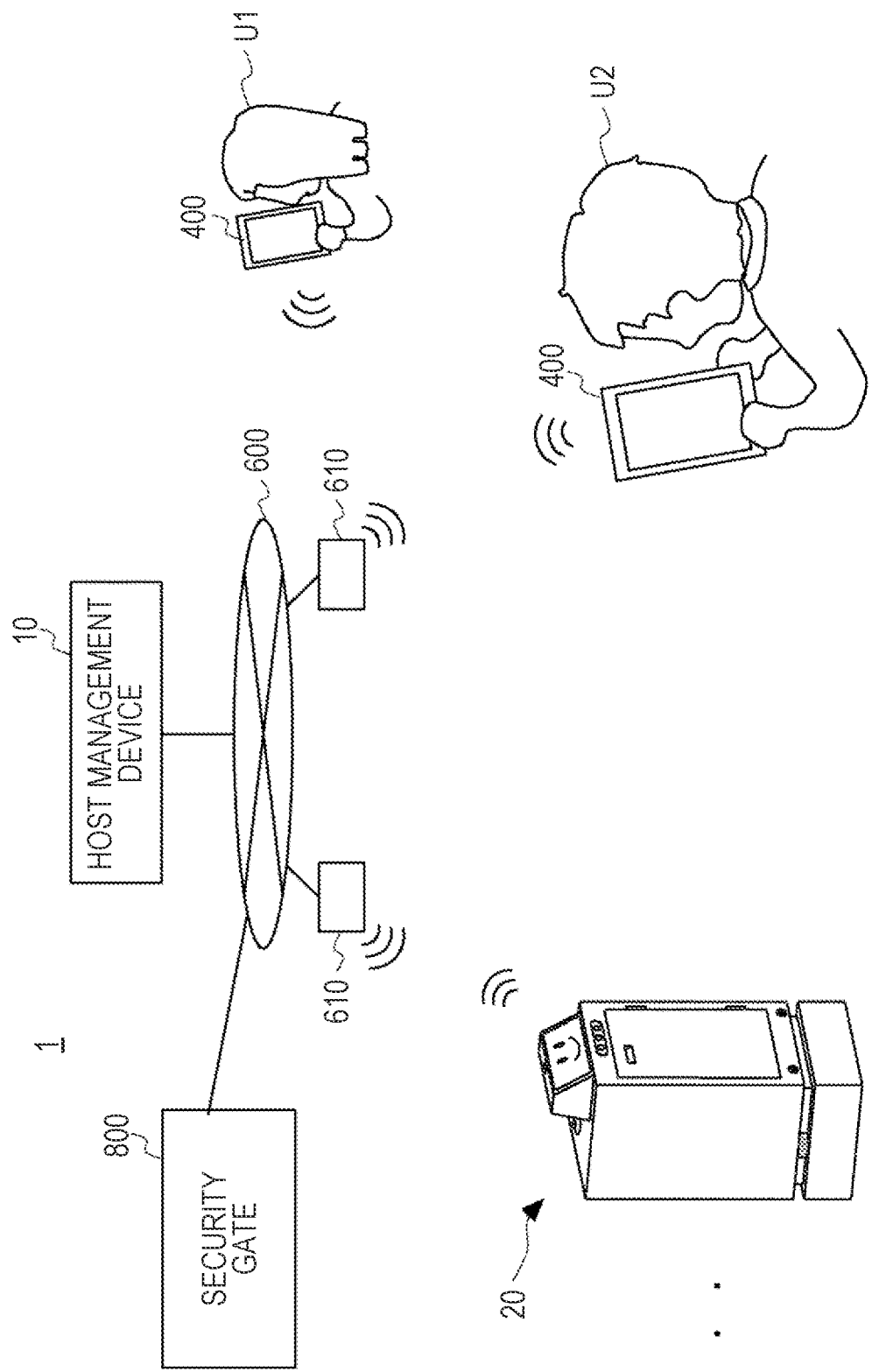
FIG. 1 is a conceptual diagram illustrating an overall configuration of a system in which a mobile robot according to an embodiment is used.

FIG. 1 is a conceptual diagram illustrating an overall configuration of a system 1 in which a mobile robot 20 according to an embodiment is used. For example, a mobile robot 20 may be a delivery robot that performs delivery of a delivery object as a task. The mobile robot 20 may travel autonomously to deliver a delivery object in a medial and welfare facility such as a hospital, a rehabilitation center, a nursing facility, or a residential home for the elderly. The system according to this embodiment can also be used in commercial facilities such as shopping malls.

A user U1 loads a delivery object onto a mobile robot 20 and makes a request for delivery thereof. The mobile robot 20 moves autonomously to a set destination and delivers a delivery object. That is, the mobile robot 20 performs an object delivery task (hereinafter simply referred to as a task). In the following description, a place in which a delivery object is loaded onto a mobile robot is referred to as a delivery source, and a place to which a delivery object is delivered is referred to as a delivery destination.

For example, it is assumed that a mobile robot 20 moves in a general hospital including a plurality of clinic departments. The mobile robot 20 delivers fixtures, expendable supplies, medical instruments, and the like between a plurality of clinic departments. For example, the mobile robot delivers a delivery object from a nurses' station of a certain clinic department to a nurses' station of another clinic department. Alternatively, the mobile robot 20 may deliver a delivery object from a storage warehouse for fixtures or medical instruments to a nurses' station of a clinic department. The mobile robot 20 delivers medicines prepared in a pharmacy to a clinic department or a patient who is scheduled to use the medicines.

Examples of the delivery object include medicines, expendable supplies such as bandages, samples, examination instruments, medical instruments, hospital meals, and fixtures such as stationery. Examples of the medical instrument include a manometer, a blood transfusion pump, a syringe pump, a foot pump, a nurse call button, a bed sensor, a continuous low-pressure suction device, an electrocardiograph monitor, an infusion instrument controller, an enteral nutrition pump, a ventilator, a cuff pressure meter, a touch sensor, an aspirator, a nebulizer, a pulse oximeter, a resuscitator, aseptic equipment, and an echo spectrometer. The mobile robot 20 may deliver meals such as hospital meals and meal preparations for examination. The mobile robot 20 may deliver used instruments, used dishes, and the like. When a delivery destination is located in another floor, the mobile robot 20 may move using an elevator or the like.

The system 1 includes a mobile robot 20, a host management device 10, a network 600, a communication unit 610, and a user terminal 400. A user U1 or a user U2 can request to deliver a delivery object using a user terminal 400. For example, the user terminal 400 is a tablet computer or a smartphone. The user terminal 400 has only to be an information processing device that can perform wireless or wired communication.

In this embodiment, the mobile robot 20 and the user terminal 400 are connected to the host management device 10 via a network 600. The mobile robot 20 and the user terminal 400 are connected to the network 600 via the communication unit 610. The network 600 is a wired or wireless local area network (LAN) or wide area network (WAN). The host management device 10 may be connected to the network 600 in a wired or wireless manner. The communication unit 610 is, for example, a wireless LAN unit which is installed in each of environments. The communication unit 610 may be a general-purpose communication device such as a WiFi router.

Various signals transmitted from the user terminal 400 of the user U1 or U2 are temporarily sent to the host management device 10 via the network 600 and are then transmitted to a target mobile robot 20 from the host management device 10. Similarly, various signals transmitted from the mobile robot 20 are temporarily sent to the host management device 10 via the network 600 and are then transmitted to a target user terminal 400 from the host management device 10. The host management device 10 is a server that is connected to the individual devices and collects data from the devices. The host management device 10 is not limited to a physically single device and may include a plurality of devices that performs distributed processes. The host management device 10 may be distributed and disposed in edge devices such as the mobile robot 20. For example, a part or overall of the system 1 may be provided in the mobile robot 20.

The user terminal 400 and the mobile robot 20 may transmit and receive signals to and from each other without using the host management device 10. For example, the user terminal 400 and the mobile robot 20 may directly transmit and receive signals to and from each other by wireless communication. Alternatively, the user terminal 400 and the mobile robot 20 may transmit and receive signals via the communication unit 610.

The user U1 or the user U2 makes a request for delivering a delivery object using the user terminal 400. In the following description, it is assumed that the user U1 is a delivery requester who is positioned in a delivery source and the user U2 is a scheduled receiver who is positioned in a delivery destination (a destination). The user U2 who is positioned in a delivery destination may request to deliver a delivery object. A user who is positioned in a place other than the delivery source or the delivery destination may request to deliver a delivery object.

When the user U1 makes a request for delivery, the user U1 inputs details of a delivery object, a reception destination of the delivery object (hereinafter also referred to as a delivery source), a place at which the delivery object has to arrive (hereinafter also referred to as a delivery destination), a scheduled arrival time at the delivery source (a reception time of the delivery object), a scheduled arrival time at the delivery destination (a delivery deadline), and the like using the user terminal 400. In the following description, such information is also referred to as delivery request information. The user U1 can input the delivery request information by operating a touch panel of the user terminal 400. The delivery source may be a place in which the user U1 is positioned, a storage place of the delivery object, or the like. The delivery destination is a place in which the user U2 or a patient who is scheduled to use the delivery object is positioned.

The user terminal 400 transmits the delivery request information which is input by the user U1 to the host management device 10. The host management device 10 is a management system that manages a plurality of mobile robots 20. The host management device 10 transmits an operation command for performing a delivery task to the mobile robots 20. The host management device 10 determines a mobile robot 20 for performing a delivery task for each delivery request. Then, the host management device 10 transmits a control signal including an operation command to the corresponding mobile robot 20. The mobile robot 20 moves to arrive at a delivery destination from a delivery source in accordance with the operation command.

For example, the host management device 10 assigns a delivery task to a mobile robot 20 which is located in a delivery source or in the vicinity thereof. Alternatively, the host management device 10 assigns a delivery task to a mobile robot 20 which is moving to a delivery source or the vicinity thereof. The mobile robot 20 to which a task is assigned moves to the delivery source to receive a delivery object. For example, a delivery source is a place in which the user U1 having requested the task is positioned.

When the mobile robot 20 arrives at the delivery source, the user U1 or another staff member loads the delivery object into the mobile robot 20. The mobile robot 20 into which the delivery object is loaded moves autonomously to the delivery destination. The host management device 10 transmits a signal to the user terminal 400 of the user U2 who is positioned in the delivery destination. Accordingly, the user U2 can ascertain whether the delivery object is being delivered or at what time the delivery object will arrive. When the mobile robot 20 arrives at the set delivery destination, the user U2 can receive the delivery object loaded in the mobile robot 20. In this way, the mobile robot 20 performs a delivery task.

With this overall configuration, a control system can be constructed as a whole by distributing elements of the control system to the mobile robot 20, the user terminal 400, and the host management device 10. Substantive elements for realizing delivery of a delivery object may be collectively provided in a single device. The host management device 10 controls one or more mobile robots 20.

The delivery system 1 includes a security gate 800. The security gate 800 includes a gate for restricting passing-through of a user or a mobile robot 20. The security gate 800 opens its gate when a user or a mobile robot 20 which has been permitted in advance is located in front of the gate. When a user or a mobile robot 20 which has been permitted in advance is not located in front of the gate, the security gate 800 closes the gate.

For example, the security gate 800 is installed in front of a room which only authenticated hospital staff members (users) can enter. That is, the security gate 800 is installed between a generally usable area (also referred to as an unrestricted area) which general users can also enter and a restricted area to which entrance is restricted. When a security level is set in multiple stages, the security gate 800 may be installed between areas having different security levels. In this case, the security gate 800 represents a boundary between the security levels.

Opening-closing control of the security gate 800 is performed based on authentication data. For example, authentication data is assigned to a user and a mobile robot which are permitted to pass through the security gate 800. Authentication data is stored in a security card which is issued to each user. The security card is an ID card or an IC card of the user. Alternatively, authentication data may be assigned to each user terminal 400.

A card reader or the like is provided in the security gate 800. When a noncontact security card is used, the gate is opened by allowing a user to put the security card over the card reader. When a predetermined time elapses after the gate has been opened, the gate is automatically closed. A card for authentication may be a noncontact type card or a contact type card. Alternatively, the security gate 800 may operate based on face authentication using an environmental camera 300 or the like.

The security gate 800 or the host management device 10 stores registration data which corresponds to the authentication data. The security gate 800 or the host management device 10 performs an authentication process based on whether the authentication data and the registration data match. The host management device 10 controls the security gate 800 such that a mobile robot 20 can pass through the security gate 800.

When a security gate 800 is installed in a route along which a mobile robot 20 moves to a destination, the mobile robot 20 transmits a passing-through reservation signal to the host management device 10. The passing-through reservation signal may include authentication data. The host management device 10 permits passing-through of the mobile robot 20 when the passing-through reservation signal is received. When the mobile robot 20 arrives at the security gate 800, the host management device 10 performs control such that the gate of the security gate 800 is opened. Then, the host management device 10 performs control such that the gate of the security gate 800 is closed after the mobile robot 20 passes through the security gate 800.

In this way, the security gate 800 performs an opening-closing operation based on the authentication data or the passing-through reservation signal. The host management device 10 controls the mobile robot 20 and the security gate 800. Accordingly, only an authenticated user and an authenticated mobile robot 20 can pass through the security gate 800. Specific authentication data is assigned to each of the mobile robots 20 and the users. The host management device 10 can manage a passing-through frequency, a passing-through time, and the like for each user and each mobile robot. Control of the security gate 800 which is performed by the host management device 10 will be described later.

Restriction of passing through the security gate 800 may be performed in a bidirectional manner or a unidirectional manner. That is, passing through the security gate 800 may be restricted only when a user or a mobile robot 20 moves in a direction in which the security level increases. In other words, authentication may not be performed when a user or a mobile robot 20 moves in a direction in which the security level decreases. In this case, the security gate 800 serves as an automatic door which is automatically opened and closed.

Control Block Diagram

Figure 2:
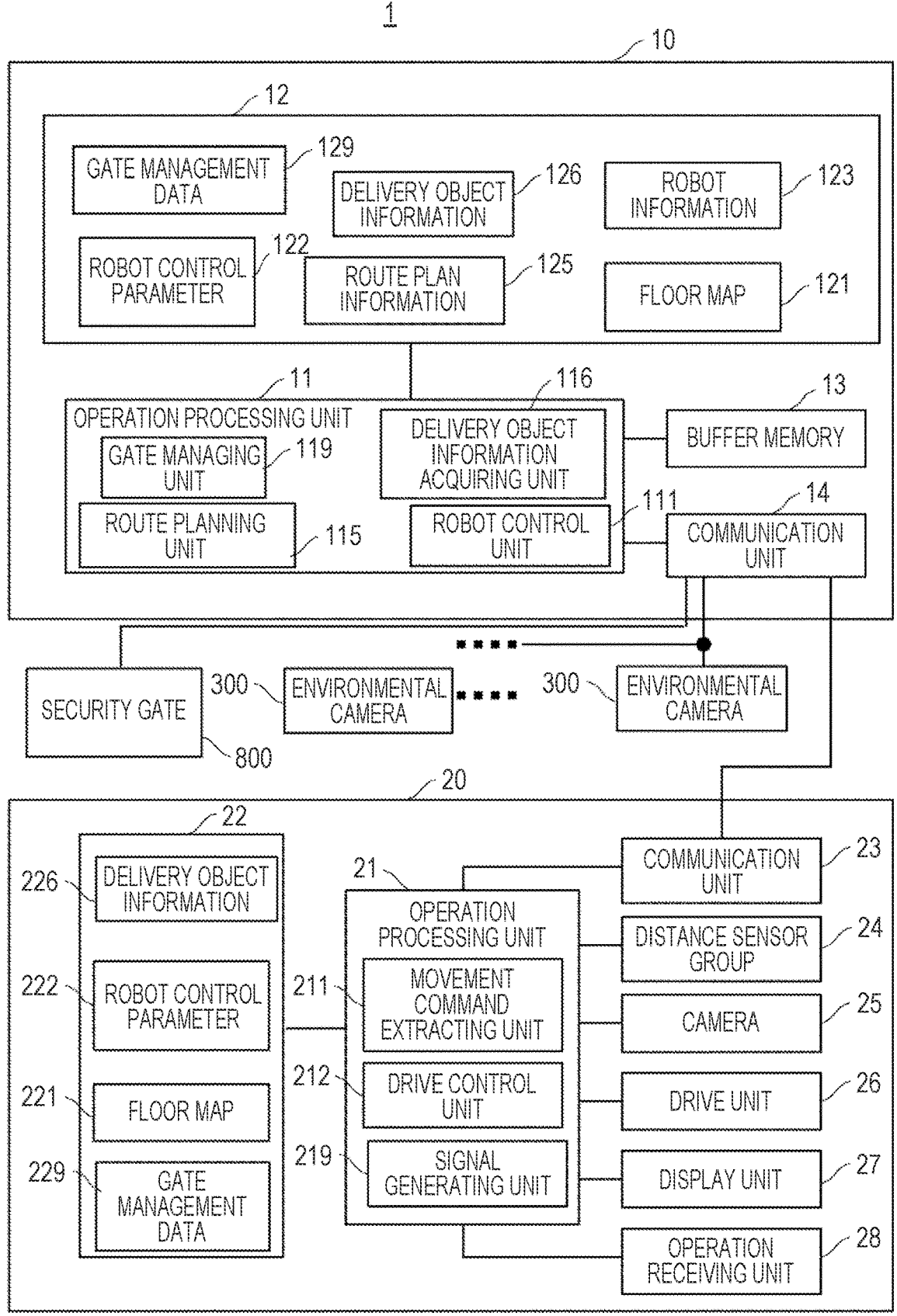
FIG. 2 is a control block diagram of a control system according to the embodiment.

FIG. 2 is a control block diagram illustrating a control system of the system 1. As illustrated in FIG. 2, the system 1 includes a host management device 10, a mobile robot 20, an environmental camera 300, and a security gate 800.

The system 1 efficiently controls a plurality of mobile robots 20 while allowing the mobile robots 20 to move autonomously in a predetermined facility. Accordingly, a plurality of environmental cameras 300 is installed in the facility. For example, the environmental cameras 300 are installed in passages, halls, elevators, entrances and exits, the vicinity of the security gate 800, and the like in the facility.

The environmental cameras 300 acquires images in a range in which the mobile robots 20 move. In the system 1, the images acquired by the environmental cameras 300 or information based thereon is collected by the host management device 10. Alternatively, the images acquired by the environmental cameras 300 or the like may be directly transmitted to the mobile robots. Each environmental camera 300 may be a monitoring camera or the like which is provided in a passage or an entrance in the facility. The environmental cameras 300 may be used to acquire a congestion distribution in the facility.

The security gate 800 restricts passing-through of a user or a mobile robot 20 as described above. The security gate 800 opens or closes its gate based on an opening-closing signal which is transmitted from the host management device 10. Control of the security gate 800 will be described later.

In the system 1 according to this embodiment, the host management device 10 plans a route based on delivery request information. The host management device 10 informs each mobile robot 20 of a destination based on route plan information which is prepared by the host management device 10. Each mobile robot 20 moves autonomously to a destination designated by the host management device 10. The mobile robot 20 moves autonomously to a destination (target) using a sensor provided therein, a floor map, position information, and the like.

For example, each mobile robot 20 travels such that it does not come into contact with instruments, objects, walls, persons, and the like in the vicinity thereof (hereinafter also referred to as nearby objects). Specifically, each mobile robot 20 detects a distance to a nearby object and travels in a state in which it is separated by a predetermined distance (referred to as a threshold distance) or more from the nearby object. When the distance to the nearby object is equal to or less than the threshold distance, the mobile robot 20 decelerates or stops. As a result, the mobile robot 20 can travel without coming into contact with a nearby object. Since contact can be avoided, it is possible to provide safe and efficient delivery. The threshold distance is a predetermined distance which is set such that each mobile robot can travel safely.

The host management device 10 includes an operation processing unit 11, a storage unit 12, a buffer memory 13, and a communication unit 14. The operation processing unit 11 performs operations for controlling and managing mobile robots 20. The operation processing unit 11 can be mounted, for example, as a device that can execute a program such as a central processing unit (CPU) of a computer. Various functions may be realized by the program. In FIG. 2, only a robot control unit 111, a route planning unit 115, a delivery object information acquiring unit 116, and a gate managing unit 119 which are features of the operation processing unit 11 are illustrated, but other processing blocks can also be provided in the operation processing unit 11.

The robot control unit 111 performs an operation for remotely controlling the mobile robot 20 and generates a control signal. The robot control unit 111 generates the control signal based on route plan information 125 or the like which will be described later. The robot control unit 111 generates the control signal based on various types of information acquired from the environmental camera 300 or the mobile robot 20. The control signal may include update information such as a floor map 121, robot information 123, and a robot control parameter 122 which will be described later. That is, when various types of information are updated, the robot control unit 111 generates the control signal corresponding to the update information.

The delivery object information acquiring unit 116 acquires information on a delivery object. The delivery object information acquiring unit 116 acquires information on details (type) of a delivery object which is being delivered by the mobile robot 20.

The route planning unit 115 creates route plans for corresponding mobile robots 20. When a delivery task is input, the route planning unit 115 creates a route plan for delivering the delivery object to a delivery destination (destination) based on delivery request information. Specifically, the route planning unit 115 determines a mobile robot 20 that performs a new delivery task with reference to the route plan information 125, the robot information 123, and the like stored in advance in the storage unit 12. A departure place may be a current position of the mobile robot 20, a delivery destination of a previous delivery task, a reception source of the delivery object, or the like. A destination may be a delivery destination of a delivery object, a waiting place (a waiting area), a charging place, or the like.

Here, the route planning unit 115 sets transit points from the departure place of the mobile robot 20 to the destination. The route planning unit 115 sets the order of passing through the transit points for each mobile robot 20. The transit points are set to, for example, junctions, crossings, and a lobby in front of an elevator or peripheries thereof. In a passage with a small width, the mobile robots 20 may have difficulty passing each other. In this case, a position in front of the passage with a small width may be set as a transit point. Candidates for the transit points may be registered in the floor map 121 in advance.

The route planning unit 115 determines mobile robot 20 that performs delivery tasks out of a plurality of mobile robots 20 such that the delivery tasks can be efficiently performed as a whole of the system. The route planning unit 115 preferentially assigns a delivery task to a waiting mobile robot 20 or a mobile robot 20 close to a delivery source.

The route planning unit 115 sets transit points including a departure place and a destination for the mobile robot 20 to which the delivery task has been assigned. For example, when there are two or more movement routes from a delivery source to a delivery destination, the route planning unit 115 sets the transit points such that the mobile robot 20 can move for a shorter time. Accordingly, the host management device 10 updates information indicating congestion of a passage based on images from cameras or the like. Specifically, a place through which another mobile robot 20 is passing or a place in which there are many people has a high degree of congestion. Accordingly, the route planning unit 115 sets the transit points such that a place with a high degree of congestion is avoided.

A mobile robot 20 may be able to move to a destination using any of a left-turn movement route and a right-turn movement route. In this case, the route planning unit 115 sets the transit points such as the mobile robot moves along a movement route with a low degree of congestion. By causing the route planning unit 115 to set one or more transit points to a destination, the mobile robot 20 can move along a movement route with a low degree of congestion. For example, when a passage branches at a junction or a crossing, the route planning unit 115 appropriately sets the transit points at junctions, crossings, turning points, and peripheries thereof. Accordingly, it is possible to improve a delivery efficiency.

The route planning unit 115 may set the transit points in consideration of a degree of congestion of an elevator, a moving distance, or the like. The host management device 10 may estimate the number of mobile robots 20 or the number of persons at a time at which the corresponding mobile robot 20 is scheduled to pass through a certain place. The route planning unit 115 may set the transit points based on the estimated degree of congestion. The route planning unit 115 may dynamically change the transit points according to change of the degree of congestion. The route planning unit 115 sequentially sets the transit points for the mobile robot 20 to which the delivery task has been assigned. The transit points may include a delivery source or a delivery destination. As will be described later, the mobile robot 20 moves autonomously such that the mobile robot 20 sequentially passes through the transit points set by the route planning unit 115.

The gate managing unit 119 manages opening-closing a gate of the security gate 800. For example, the host management device 10 receives authentication data of a user or a mobile robot 20 located in front of the security gate 800. The gate managing unit 119 performs an authentication process based on the authentication data from the user or the mobile robot 20. The gate managing unit 119 determines whether the authentication data acquired from the user or the mobile robot 20 matches registration data stored in the storage unit 12. When the authentication data matches the registration data, the host management device 10 transmits an agreement signal (also referred to as an opening signal) to the security gate 800. The security gate 800 opens the gate when the agreement signal is received from the host management device 10.

When the authentication data does not match the registration data, the host management device 10 transmits a disagreement signal to the security gate 800. When the disagreement signal is received from the host management device 10, the security gate 800 does not open the gate of the security gate 800. In this case, the security gate 800 may issue an alarm or re-request authentication data. In this way, the gate managing unit 119 controls opening-closing of the security gate 800 based on the result of authentication.

The gate managing unit 119 may generate a passing-through permission signal. The passing-through permission signal is a signal for permitting passing through the gate. For example, when the host management device 10 receives a passing-through reservation signal from a mobile robot 20 or the like, the gate managing unit 119 generates a passing-through permission signal. The gate managing unit 119 generates an opening-closing signal for opening or closing the security gate 800 in accordance with a signal from a mobile robot 20 or the like. Some or all of processes which are performed by the gate managing unit 119 may be performed by the security gate 800. That is, the security gate 800 may include a processor for performing the processes.

The storage unit 12 is a storage unit that stores information required for robot management and control. In the example illustrated in FIG. 2, a floor map 121, robot information 123, a robot control parameter 122, route plan information 125, delivery object information 126, and gate management data 129 are illustrated, but other information may be stored in the storage unit 12. The operation processing unit 11 performs operations using information stored in the storage unit 12 at the time of performing various processes. Various types of information stored in the storage unit 12 can be updated with newest information.

The floor map 121 is map information of the facility in which mobile robots 20 move. The floor map 121 may be prepared in advance, generated from information acquired from the mobile robots 20, or generated by adding map correction information generated from the information acquired from the mobile robots 20 to a basic map which has been prepared in advance.

The floor map 121 includes position information or the like of the security gate 800. The floor map 121 stores position coordinates of the security gate 800. When there is a plurality of security gates 800 in the facility, the floor map 121 includes position information of the security gates 800. For example, position coordinates are added to an ID of each security gate 800. The floor map 121 may include information on a restricted area and an unrestricted area. When the security level is set in multiple stages, information on the security level may be added to the floor map 121. In the floor map 121, a transmission point or a transmission area in which a signal such as a passing-through reservation signal is transmitted may be set in the vicinity of the security gate 800.

In the robot information 123, IDs, model numbers, specifications, and the like of mobile robots 20 which are managed by the host management device 10 are described. The robot information 123 may include position information indicating current positions of the mobile robots 20. The robot information 123 may include information indicating whether each mobile robot 20 is performing a task or waiting. The robot information 123 may include information indicating whether each mobile robot 20 is operating or out of order. The robot information 123 may include information of deliverable objects and non-deliverable objects. The robot information 123 may include information of a horizontal size of each mobile robot 20.

In the robot control parameter 122, control parameters such as a threshold distance between each mobile robot 20 managed by the host management device 10 and a nearby object are described. The threshold distance is a margin distance for avoiding contact with a nearby object including a person. The robot control parameter 122 may include information on a degree of operation such as an upper speed limit of a moving speed of each mobile robot 20.

In the robot control parameter 122, a plurality of threshold distances and a plurality of upper speed limits may be set. The host management device 10 may appropriately change the threshold distance and the upper speed limit. For example, the threshold distance and the upper speed limit may be set in stages. The threshold distance and the upper speed limit which are set in stages may be correlated. For example, in a high-speed mode with a large upper speed limit, sudden stopping or deceleration is difficult and thus the threshold distance is set to be large. In a low-speed mode with a small upper speed limit, sudden stopping or deceleration is easy and thus the threshold distance is set to be small. In this way, the threshold distance may be changed according to the upper speed limit. The operation processing unit 11 may change the upper speed limit or the like according to delivery object information or environment information. The host management device 10 selects an upper speed limit and a threshold distance out of the robot control parameters according to the environment or conditions. When the upper speed limit and the threshold distance are updated, the host management device 10 transmits the updated data to the corresponding mobile robot 20.

The robot control parameter 122 may be updated according to the conditions. The robot control parameter 122 may include information indicating availability conditions of an accommodation space of the storage unit 291. The robot control parameter 122 may include information of deliverable objects and undeliverable objects. In the robot control parameter 122, various types of information are correlated with the corresponding mobile robots 20.

The robot control parameter 122 may include a parameter for transmitting a passing-through reservation signal or the like. Examples of the parameter for transmitting a passing-through reservation signal or the like include a distance and a time required for movement to the security gate 800. For example, when a mobile robot 20 moves along a route passing through the security gate 800 and a moving distance to the security gate 800 is equal to or less than a predetermined distance, the mobile robot 20 transmits the passing-through reservation signal. Alternatively, when a moving time to the security gate 800 is equal to or less than a predetermined time, the mobile robot 20 transmits the passing-through reservation signal or the like. The robot control parameter 122 may include data on the predetermined distance or the predetermined time. The predetermined value (threshold value) for the moving time or the moving distance may be different between a plurality of mobile robots 20 or may be common between a plurality of mobile robots 20.

The route plan information 125 includes route plan information of a plan which is created by the route planning unit 115. The route plan information 125 includes, for example, information indicating a delivery task. The route plan information 125 may include information such as an ID of a mobile robot 20 to which a task has been assigned, a departure place, details of a delivery object, a delivery destination, a delivery source, a scheduled arrival time at the delivery destination, a scheduled arrival time at the delivery source, and an arrival deadline. In the route plan information 125, various types of information may be correlated for each delivery task. The route plan information 125 may include at least a part of delivery request information which is input from a user U1.

The route plan information 125 may include information on transit points for each mobile robot 20 or each delivery task. For example, the route plan information 125 may include information indicating the order of passing through the transit points for each mobile robot 20. The route plan information 125 may include coordinates of the transit points in the floor map 121 or information indicating whether the corresponding mobile robot has passed through the transit points.

The delivery object information 126 is information on a delivery object for which a delivery request has been transmitted. For example, the delivery object information 126 includes information such as details (types) of a delivery object, a delivery source, and a delivery destination. The delivery object information 126 may include an ID of a mobile robot 20 that takes charge of the delivery. The delivery object information 126 may include information indicating a status such as carrying, before carrying (before loading), or carried. In the delivery object information 126, such information is correlated for each delivery object. The delivery object information 126 will be described later.

The route planning unit 115 creates a route plan with reference to various types of information stored in the storage unit 12. For example, the route planning unit 115 determines a mobile robot 20 that performs a task based on the floor map 121, the robot information 123, the robot control parameter 122, and the route plan information 125. The route planning unit 115 sets transit points to a delivery destination and the passing-through order with reference to the floor map 121 or the like. In the floor map 121, candidates for the transit points are registered in advance. The route planning unit 115 sets the transit points based on congestion conditions or the like. When tasks are consecutively processed, or the like, the route planning unit 115 may set a delivery source and a delivery destination as transit points.

One delivery task may be assigned to two or more mobile robots 20. For example, when a delivery object has a capacity greater than a deliverable capacity of one mobile robot 20, one delivery object is divided into two parts and is loaded to two mobile robots 20. Alternatively, when a delivery object has a weight greater than a deliverable weight of one mobile robot 20, one delivery object is divided into two parts and is loaded to two mobile robots 20. In this way, one delivery task can be performed through distribution to two or more mobile robots 20. When mobile robots 20 with different sizes are controlled, a route plan may be created such that a mobile robot 20 that can deliver a delivery object receives the delivery object.

One mobile robot 20 may perform two or more delivery tasks in parallel. For example, one mobile robot 20 may load two or more delivery objects at the same time and sequentially deliver the two or more delivery objects to different delivery destinations. Alternatively, a mobile robot 20 may receive another delivery object while delivering one delivery object. The delivery destination of the delivery objects which are loaded at different places may be the same or may be different. As a result, it is possible to efficiently perform the tasks.

In this case, accommodation information indicating availability conditions for the accommodation space of each mobile robot 20 may be updated. That is, the host management device 10 may manages the accommodation information indicating availability conditions and control the mobile robot 20. For example, when loading or reception of a delivery object is completed, the accommodation information is updated. When a delivery task is input, the host management device 10 causes a mobile robot 20 with an available space in which a delivery object can be loaded to move for reception of the delivery object with reference to the accommodation information. As a result, one mobile robot 20 can perform a plurality of delivery tasks at the same time or two or more mobile robots 20 can perform a delivery task together. For example, a sensor may be provided in the accommodation space of each mobile robot 20 and detect availability conditions thereof. A capacity or a weight of each delivery object may be registered in advance.

The gate management data 129 stores data or parameters for authentication when a user and a mobile robot 20 pass through the security gate 800. In the gate management data 129, authentication data assigned to each user and each mobile robot 20 is stored as registration data. That is, a user ID or a robot ID is correlated with registration data. The host management device 10 transmits authentication data corresponding to the registration data to each mobile robot 20.

The authentication data transmitted from the host management device 10 is stored in each mobile robot 20. A manager of the system can manage the registration data or the authentication data. The gate management data 129 may include data such as a passing-through frequency or a passing-through time in which each user or each mobile robot 20 has passed through the security gate 800.

The gate management data 129 may not store the authentication data. For example, a passable gate and an impassable gate may be assigned to each user ID or each robot ID. At least a part of the gate management data 129 may be stored in the security gate 800. That is, the security gate 800 may include a memory that stores the gate management data 129.

The buffer memory 13 is a memory that stores intermediate information which is generated in the processes performed by the operation processing unit 11. The communication unit 14 is a communication interface that communicates with a plurality of environmental cameras 300 provided in the facility used in the system 1 and at least one mobile robot 20. The communication unit 14 can perform both wired communication and wireless communication. For example, the communication unit 14 transmits a control signal required for control of each mobile robot 20 to the corresponding mobile robot 20. The communication unit 14 receives information collected by the mobile robots 20 or the environmental cameras 300.

The communication unit 14 receives a passing-through reservation signal, a passing-through start signal, a passing-through completion signal, and the like from each mobile robot 20 or the like. The communication unit 14 transmits a passing-through permission signal to the corresponding mobile robot 20. The communication unit 14 transmits an opening-closing signal to the security gate 800.

Each mobile robot 20 includes an operation processing unit 21, a storage unit 22, a communication unit 23, a proximity sensor (for example, a distance sensor group 24), a camera 25, a drive unit 26, a display unit 27, and an operation receiving unit 28. Only representative processing blocks provided in a mobile robot 20 are illustrated in FIG. 2, but the mobile robot 20 includes other processing blocks which are not illustrated.

The communication unit 23 is a communication interface that communicates with the communication unit 14 of the host management device 10. The communication unit 23 communicates with the communication unit 14, for example, using a radio signal. The distance sensor group 24 is, for example, a proximity sensor and outputs nearby object distance information indicating a distance to an object or a person near the mobile robot 20. For example, the camera 25 captures an image for ascertaining surrounding conditions of the mobile robot 20. For example, the camera 25 may image position markers that are provided on the ceiling of the facility. The mobile robot 20 may be caused to ascertain its position using the position markers.

The communication unit 23 transmits a passing-through reservation signal, a passing-through start signal, a passing-through completion signal, and the like to the host management device 10. The communication unit 23 receives a passing-through permission signal from the host management device 10.

The drive unit 26 drives driving wheels that are provided in the mobile robot 20. The drive unit 26 may include an encoder or the like that detects the number of rotations of the driving wheels or a drive motor thereof. The position (current position) may be estimated based on an output of the encoder. The mobile robot 20 detects the current position and transmits the detected current position to the host management device 10.

The display unit 27 and the operation receiving unit 28 are realized by a touch panel display. The display unit 27 displays a user interface screen serving as the operation receiving unit 28. Information indicating a destination of the mobile robot 20 or conditions of the mobile robot 20 may be displayed on the display unit 27. The operation receiving unit 28 receives an operation from a user. The operation receiving unit 28 includes various switches provided in the mobile robot 20 in addition to a user interface screen displayed on the display unit 27.

The operation processing unit 21 performs operations for controlling the mobile robot 20. The operation processing unit 21 can be mounted, for example, as a device that can execute a program such as a central processing unit (CPU) of a computer. Various functions may be realized by the program. The operation processing unit 21 includes a movement command extracting unit 211 and a drive control unit 212. In FIG. 2, only representative processing blocks provided in the operation processing unit 21 are illustrated, but other processing blocks which are not illustrated can also be provided in the operation processing unit 21. The operation processing unit 21 may search routes between transit points.

The movement command extracting unit 211 extracts a movement command from a control signal transmitted from the host management device 10. For example, the movement command includes information on a next transit point. For example, the control signal may include information on coordinates of the transit points and the order of passing through the transit points. The movement command extracting unit 211 extracts such information as the movement command.

The movement command may include information indicating that movement to a next transit point is possible. In a passage with a small width, mobile robots 20 may not be able to pass each other. A mobile robot may not be able to temporarily pass through the passage. In this case, the control signal includes a command for stopping a mobile robot 20 at a transit point in front of a place in which the mobile robot has to stop. After another mobile robot 20 has passed through the transit point or after passing through the passage has become possible, the host management device 10 outputs the control signal indicating that movement has become possible to the mobile robot 20. Accordingly, the mobile robot 20 stopping temporarily restarts its movement.

The drive control unit 212 controls the drive unit 26 such that the mobile robot 20 moves based on the movement command given from the movement command extracting unit 211. For example, the drive unit 26 includes driving wheels that rotate based on a control command value from the drive control unit 212. The movement command extracting unit 211 extracts the movement command such that the mobile robot 20 moves to the transit point received from the host management device 10. The drive unit 26 rotationally drives the driving wheels. The mobile robot 20 moves autonomously to a next transit point. In this way, the mobile robot 20 sequentially passes through the transit points and arrives at a delivery destination. The mobile robot 20 may estimate its position and transmit a signal indicating that it has passed through the transit point to the host management device 10. Accordingly, the host management device 10 can manage the current position or the delivery status of each mobile robot 20.

A signal generating unit 219 generates a signal required for a process for allowing the mobile robot to pass through the security gate 800. For example, the signal generating unit 219 generates a passing-through reservation signal, a passing-through start signal, a passing-through completion signal, and the like. The signal generating unit 219 generates various signals using the current position of the mobile robot 20, a floor map 221, a robot control parameter 222, gate management data 229, or the like. The signal generating unit 219 may add authentication data, a robot ID, or the like to the generated signal. When there is a plurality of security gates 800, the signal generating unit 219 may add a gate ID, position information, or the like of a security gate 800 through which is to be passed to the generated signal. Various signals generated by the signal generating unit 219 are transmitted from the communication unit 23 to the host management device 10 or the security gate 800.

The storage unit 22 stores the floor map 221, the robot control parameter 222, the delivery object information 226, and the gate management data 229. A part of the information stored in the storage unit 22 is illustrated in FIG. 2 and the information includes information other than the floor map 221, the robot control parameter 222, and the delivery object information 226 illustrated in FIG. 2. The floor map 221 is map information of the facility in which the mobile robot 20 moves. The floor map 221 is acquired, for example, by downloading the floor map 121 of the host management device 10. The floor map 221 may be prepared in advance. The floor map 221 may not be map information of the whole facility but may be map information partially including areas in which the mobile robot is scheduled to move.

The position information of the security gate 800 is set in the floor map 221. That is, the floor map 221 includes information on the security gate 800. The floor map 221 may include information on a transmission point or a transmission area in which a passing-through reservation signal is transmitted.

The robot control parameter 222 includes parameters for operating the mobile robot 20. The robot control parameter 222 includes, for example, a threshold distance from a nearby object. The robot control parameter 222 also includes an upper speed limit of the mobile robot 20. When an updated robot control parameter 122 is received from the host management device 10 by the mobile robot 20, data of the robot control parameter 222 is updated.

The robot control parameter 122 may include parameters for transmitting a passing-through reservation signal or the like. The parameters for transmitting a passing-through reservation signal or the like include a moving distance or a moving time to the security gate 800 as described above. That is, as the robot control parameter 122, a threshold value for the moving distance or the moving time to the security gate 800 may be set.

The gate management data 229 includes authentication data which is used for authentication in the security gate 800. The authentication data is data specific to each mobile robot 20. As described above, data corresponding to registration data transmitted from the host management device 10 is the gate management data 229. At the time of passing through the security gate 800, the mobile robot 20 transmits a passing-through reservation signal including the authentication data to the host management device 10 or the security gate 800. The gate managing unit 119 performs an authentication process by comparing the authentication data from the mobile robot 20 with the registration data registered in the gate management data 129.

Control may be performed such that the threshold distance changes step by step according to the moving speed while the mobile robot is moving. For example, when the mobile robot 20 accelerates and reaches a high speed, the threshold distance is increased. That is, when the speed of the mobile robot 20 is higher than the speed threshold value, the threshold distance is increased. When the mobile robot 20 is moving at a high speed, a braking distance increases and thus it is preferable to increase the threshold distance which is a margin distance. Accordingly, when the mobile robot 20 moves in a low-speed mode in which the speed is lower than the speed threshold value and when the mobile robot 20 moves in a high-speed mode in which the speed is equal to or higher than the speed threshold value, the threshold distance may be changed. The threshold distance may be divided into three or more stages. For example, the movement mode may be set to three stages including a high-speed mode, a middle-speed mode, and a low-speed mode and different threshold distances may be set for the movement modes. As the speed becomes higher, the threshold distance becomes greater. That is, the threshold distance in the lowest-speed mode is the smallest.

The delivery object information 226 includes information on a delivery object similarly to the delivery object information 126. The delivery object information 226 includes information such as details (types) of a delivery object, a delivery source, and a delivery destination. The delivery object information 226 may include information indicating a status such as carrying, before carrying (before loading), or carried. In the delivery object information 226, such information is correlated for each delivery object. The delivery object information 226 will be described later. The delivery object information 226 has only to include information on a delivery object which is delivered by the mobile robot 20. Accordingly, the delivery object information 226 is a part of the delivery object information 126. That is, the delivery object information 226 may not include information of a delivery object which is delivered by another mobile robot 20.

The drive control unit 212 stops its operation or decelerates the mobile robot when the distance indicated by distance information acquired from the distance sensor group 24 is less than the threshold distance with reference to the robot control parameter 222. The drive control unit 212 controls the drive unit 26 such that the mobile robot travels at a speed equal to or lower than the upper speed limit. The drive control unit 212 limits rotation speeds of the driving wheels such that the mobile robot 20 does not move at a speed equal to or higher than the upper speed limit.

Configuration of Mobile Robot 20

Figure 3:
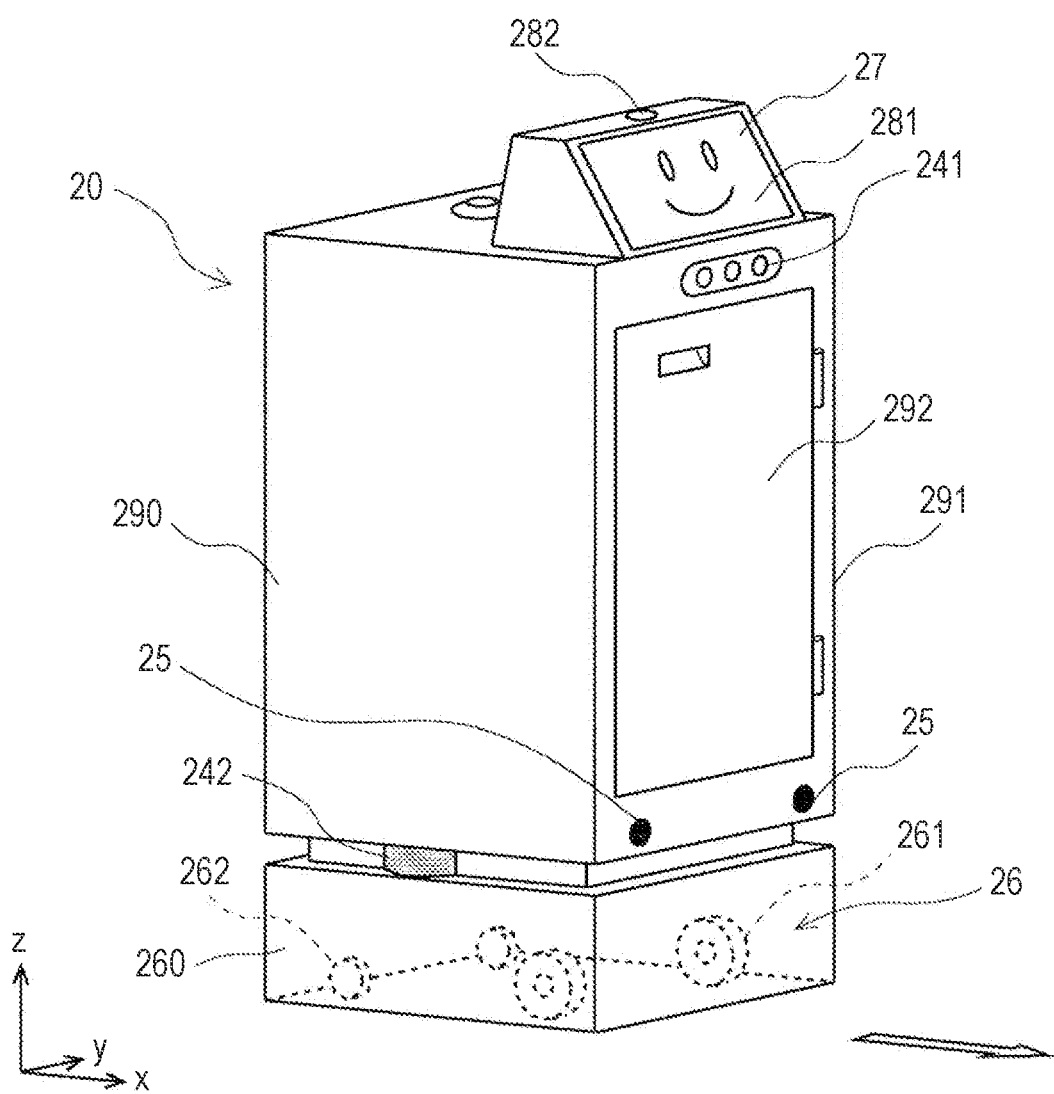
FIG. 3 is a diagram schematically illustrating an example of a mobile robot.

Appearance of a mobile robot 20 will be described below. FIG. 3 is a diagram schematically illustrating a mobile robot 20. The mobile robot 20 illustrated in FIG. 3 is an example of a mobile robot 20 and may have another shape. In FIG. 3, an x direction defines a forward direction and a backward direction of the mobile robot 20, a y direction defines a lateral direction of the mobile robot 20, and a z direction defines a height direction of the mobile robot 20.

The mobile robot 20 includes a body unit 290 and a bogie unit 260. The body unit 290 is mounted on the bogie unit 260. The body unit 290 and the bogie unit 260 each have a housing of a rectangular parallelepiped shape, and constituents thereof are mounted in the housing. For example, the drive unit 26 is accommodated in the bogie unit 260.

A storage unit 291 serving as an accommodation space and a door 292 sealing the storage unit 291 are provided in the body unit 290. Shelves in a plurality of stages are provided in the storage unit 291 and availability is managed for each stage. For example, by disposing various sensors such as a weight sensor in each stage, the availability can be updated. The mobile robot 20 delivers a delivery object accommodated in the storage unit 291 to a destination instructed from the host management device 10 by autonomous movement. The body unit 290 may have a control box which is not illustrated in the housing thereof. The door 292 may be able to be locked with an electronic key or the like. When the mobile robot 20 arrives at a delivery destination, a user U2 unlocks the door 292 with the electronic key. Alternatively, when the mobile robot 20 arrives at the delivery destination, the door 292 may be automatically unlocked.

As illustrated in FIG. 3, a longitudinal distance sensor 241 and a lateral distance sensor 242 are provided as the distance sensor group 24 on outer surfaces of the mobile robot 20. The mobile robot 20 measures a distance from a nearby object in the longitudinal direction of the mobile robot 20 using the longitudinal distance sensor 241. The mobile robot 20 measures a distance from a nearby object in the lateral direction of the mobile robot 20 using the lateral distance sensor 242.

For example, longitudinal distance sensor 241 is provided on the front surface and the rear surface of the housing of the body unit 290. The lateral distance sensor 242 is provided on the right side surface and the left side surface of the housing of the body unit 290. The longitudinal distance sensor 241 and the lateral distance sensor 242 are, for example, ultrasonic distances sensors or laser range finders. The longitudinal distance sensor 241 and the lateral distance sensor 242 detect a distance to a nearby object. When the distance to a nearby object detected by the longitudinal distance sensor 241 or the lateral distance sensor 242 is equal to or less than the threshold distance, the mobile robot 20 decelerates or stops.

A driving wheel 261 and a caster 262 are provided in the drive unit 26. The driving wheel 261 is a wheel for causing the mobile robot 20 to move longitudinally and laterally. The caster 262 is a driven wheel to which a driving force is not applied and which rolls to follow the driving wheel 261. The drive unit 26 includes a drive motor which is not illustrated and drives the driving wheels 261.

For example, the drive unit 26 supports two driving wheels 261 and two casters 262 which are in contact with a floor surface in the housing. The two driving wheels 261 are arranged such that rotation axes thereof match each other. The driving wheels 261 are independently rotationally driven by motors which are not illustrated. The driving wheels 261 rotates in accordance with a control command value from the drive control unit 212 illustrated in FIG. 2. The casters 262 are driven wheels in which a turning axis extending in the vertical direction from the drive unit 26 is apart from a rotation axis of the driven wheels and axially supports the driven wheels and which follows the driving wheels in the moving direction of the drive unit 26.

For example, the mobile robot 20 moves straight when the two driving wheels 261 rotate in the same direction at the same rotation speed, and turns around a vertical axis passing through almost the center of the two driving wheels 261 when the two driving wheels 261 rotate in the opposite directions at the same rotation speed. The mobile robot 20 can travel while turning to right and left by causing the two driving wheels 261 to rotate in the same direction at different rotation speeds. For example, the mobile robot 20 can turn to right by setting the rotation speed of the left driving wheel 261 to be higher than the rotation speed of the right driving wheel 261. On the other hand, the mobile robot 20 can turn to left by setting the rotation speed of the right driving wheel 261 to be higher than the rotation speed of the left driving wheel 261. That is, the mobile robot 20 can perform translation, turning, turning to right or left, and the like in an arbitrary direction by controlling the rotation directions and the rotation speeds of the two driving wheels 261.

In the mobile robot 20, a display unit 27 and an operation interface 281 are provided on the top surface of the body unit 290. The operation interface 281 is displayed on the display unit 27. When a user touches the operation interface 281 displayed on the display unit 27, the operation receiving unit 28 can receive an instruction input from the user. An emergency stop button 282 is provided above the display unit 27. The emergency stop button 282 and the operation interface 281 serve as the operation receiving unit 28.

The display unit 27 is, for example, a liquid crystal display and displays a face of a character as an illustration or presents information on the mobile robot 20 as text or an icon. When a face of a character is displayed on the display unit 27, the display unit 27 impresses nearby observers with a pseudo face. The display unit 27 or the like mounted in the mobile robot 20 can also be used as a user terminal 400.

A camera 25 is provided on the front surface of the body unit 290. Here, two cameras 25 function as a stereo camera. That is, two cameras 25 having the same angle of view are arranged apart in the horizontal direction. Each camera 25 outputs an image captured thereby as image data. A distance to a subject or a size of a subject can be calculated based on the image data from the two cameras 25. The operation processing unit 21 can detect a person, an obstacle, or the like ahead in the moving direction by analyzing the images from the cameras 25. When a person, an obstacle, or the like is present ahead in the traveling direction, the mobile robot 20 moves along a route while avoiding it. The image data from the cameras 25 is transmitted to the host management device 10.

The mobile robot 20 recognizes a nearby object or identify its position by analyzing the image data output from the cameras 25 or detection signals output from the longitudinal distance sensor 241 and the lateral distance sensor 242. The cameras 25 capture an image ahead in the traveling direction of the mobile robot 20. The mobile robot 20 sets the side on which the cameras 25 are provided as its front side as illustrated in the drawing. That is, the forward side of the mobile robot 20 is the traveling side thereof as indicated by an arrow at the time of normal movement.

Opening-Closing Operation of Security Gate 800
Opening-Closing Operation Example 1

Figure 4:
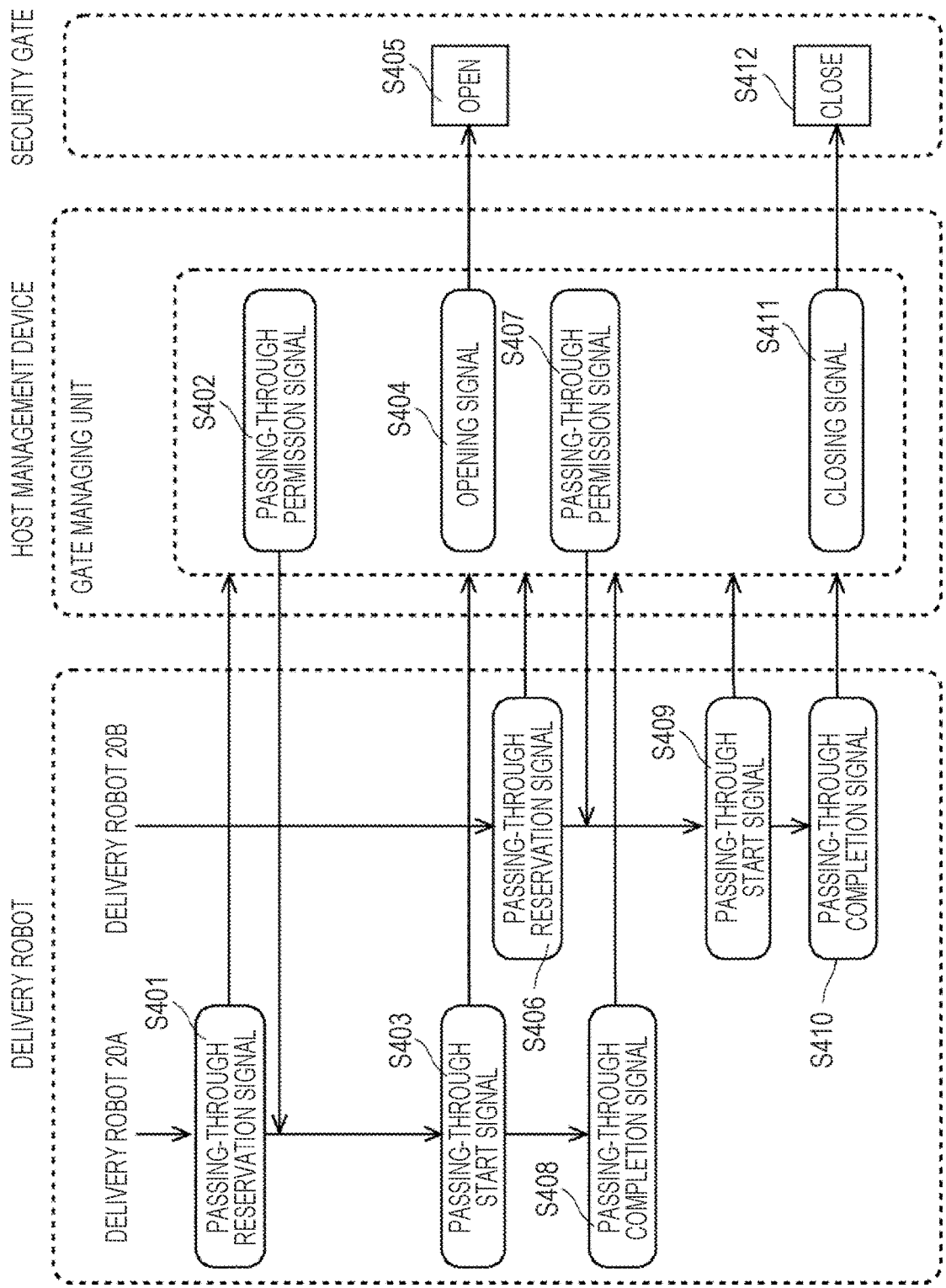
FIG. 4 is a timing chart illustrating Operation Control Example 1 according to the embodiment.

A control operation of allowing a mobile robot 20 to pass through the security gate 800 will be described below. FIG. 4 is a timing chart illustrating transmission and reception of signals between the mobile robot 20, the host management device 10, and the security gate 800. FIGS. 5 to 8 are diagrams schematically illustrating a control operation of allowing a mobile robot 20 to pass through the security gate 800. Specifically, FIGS. 5 to 8 are top views schematically illustrating surroundings of the security gate 800.

Figure 5:
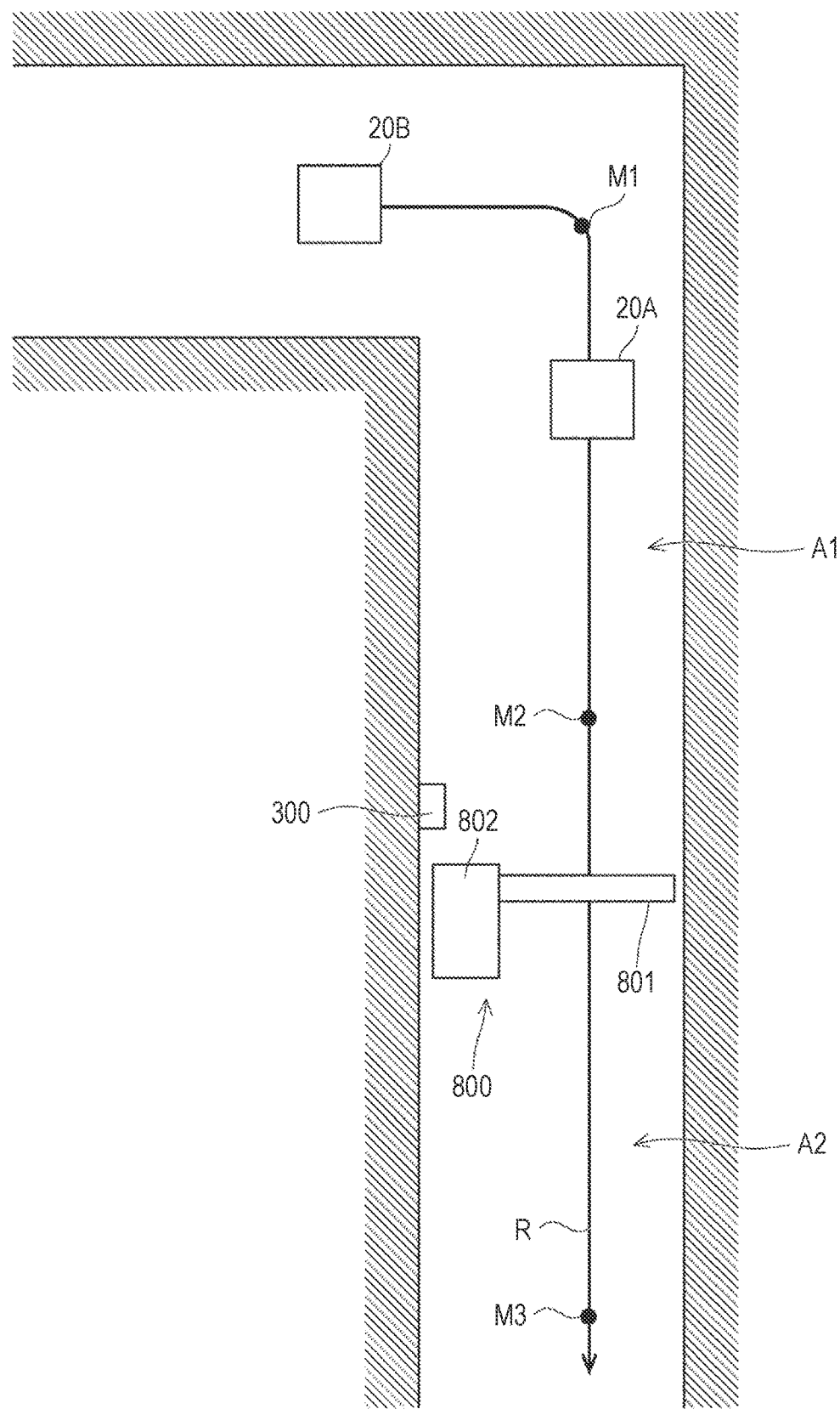
FIG. 5 is a diagram illustrating an operation of allowing mobile robots to consecutively pass through a security gate.

In FIGS. 5 to 8, two mobile robots 20 are illustrated as mobile robots 20A and 20B. In the following description, it is assumed that the mobile robot 20A and the mobile robot 20B consecutively pass through the security gate 800. As illustrated in FIG. 5 and the like, the mobile robot 20A and the mobile robot 20B move in the same direction along a common route R. For example, the mobile robot 20B moves along the route R in the order of transit points M1, M2, and M3. The mobile robot 20A travels in front of the mobile robot 20B. The mobile robot 20A moves along the route R in the order of transit points M2 and M3.

The security gate 800 is installed between the transit point M2 and the transit point M3. An unrestricted area A1 is defined before the security gate 800, and a restricted area A2 is defined after the security gate 800. The security gate 800 is installed in a passage connecting the unrestricted area A1 and the restricted area A2. An environmental camera 300 that images a user or a mobile robot 20 which passes through the security gate 800 is disposed near the security gate 800.

The security gate 800 includes a gate 801 and a body unit 802. The body unit 802 includes a motor or a mechanism that opens and closes the gate 801. A card reader over which a user puts a card may be provided in the body unit 802. The body unit 802 may include a processor or a control circuit that controls opening-closing of the gate 801.

First, in the stage illustrated in FIG. 5, the mobile robot 20A transmits a passing-through reservation signal to the host management device 10 (S401). For example, when a moving distance from a current position of the mobile robot 20A to the security gate 800 is equal to or less than a predetermined distance, the signal generating unit 219 of the mobile robot 20A generates a passing-through reservation signal. The communication unit 23 transmits the passing-through reservation signal to the host management device 10. Accordingly, the mobile robot 20A can reserve passing through the security gate 800. The passing-through reservation signal may include a robot ID of the mobile robot 20A, a scheduled passing-through time, delivery object information, or authentication data. When the passing-through reservation signal is received from the mobile robot 20A, the host management device 10 transmits a passing-through permission signal to the mobile robot 20A (S402).

Figure 6:
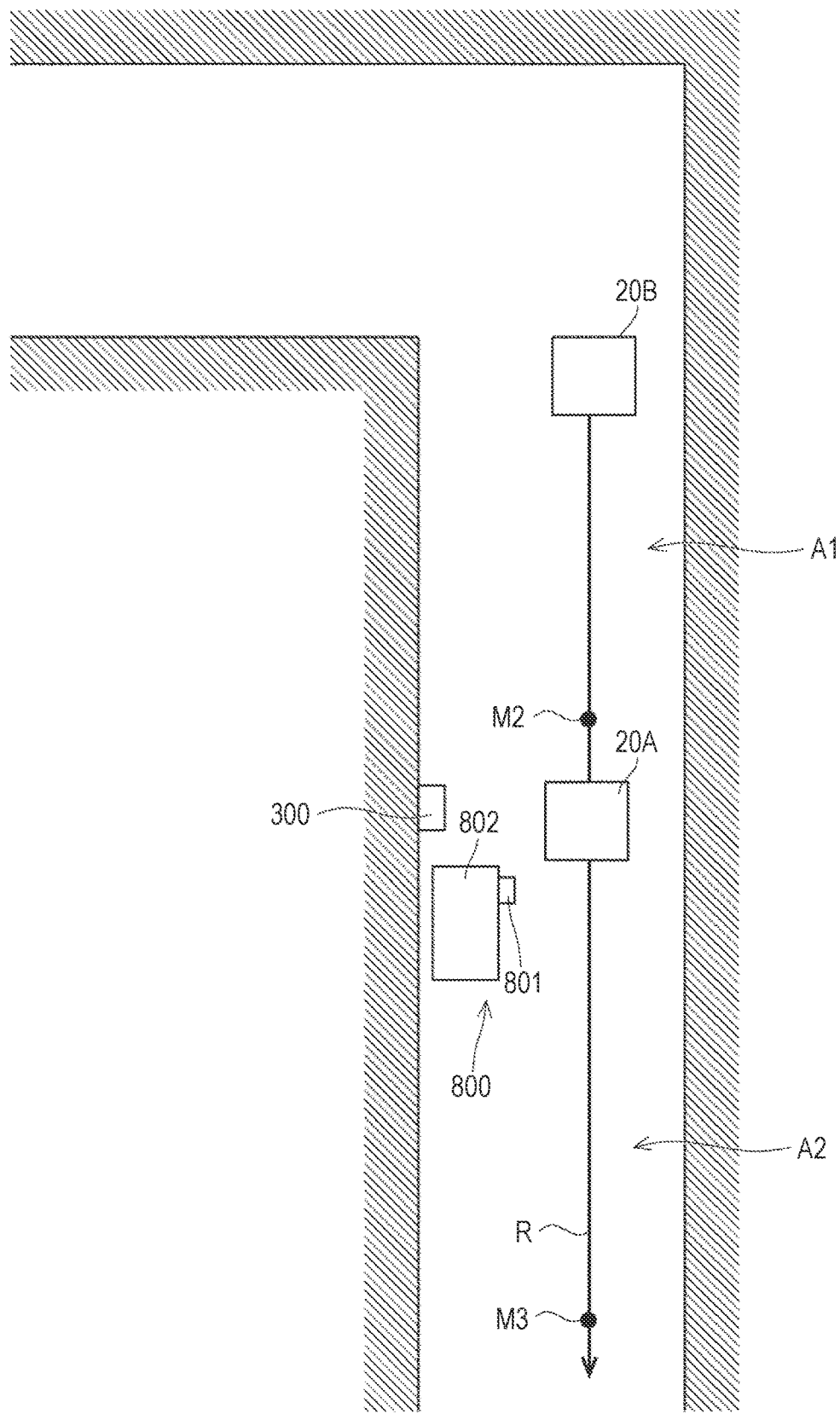
FIG. 6 is a diagram illustrating an operation of allowing mobile robots to consecutively pass through a security gate.

The mobile robot 20A and the mobile robot 20B move to the security gate 800. When the mobile robot 20A arrives at the security gate 800, the mobile robot 20A transmits a passing-through start signal to the host management device 10 (S403). When the passing-through start signal is received, the host management device 10 transmits an opening signal to the security gate 800 (S404). Accordingly, as illustrated in FIG. 6, the security gate 800 opens the gate 801 (S405).

When the mobile robots 20A and 20B further move, the mobile robot 20B transmits a passing-through reservation signal to the host management device 10 (S406). When a moving distance from a current position of the mobile robot 20B to the security gate 800 is equal to or less than a predetermined distance, the signal generating unit 219 of the mobile robot 20B generates the passing-through reservation signal. Then, the communication unit 23 transmits the passing-through reservation signal to the host management device 10. Accordingly, the mobile robot 20B can reserve passing through the security gate 800. When the passing-through reservation signal is received from the mobile robot 20B, the host management device 10 transmits a passing-through permission signal to the mobile robot 20B (S407).

Figure 7:
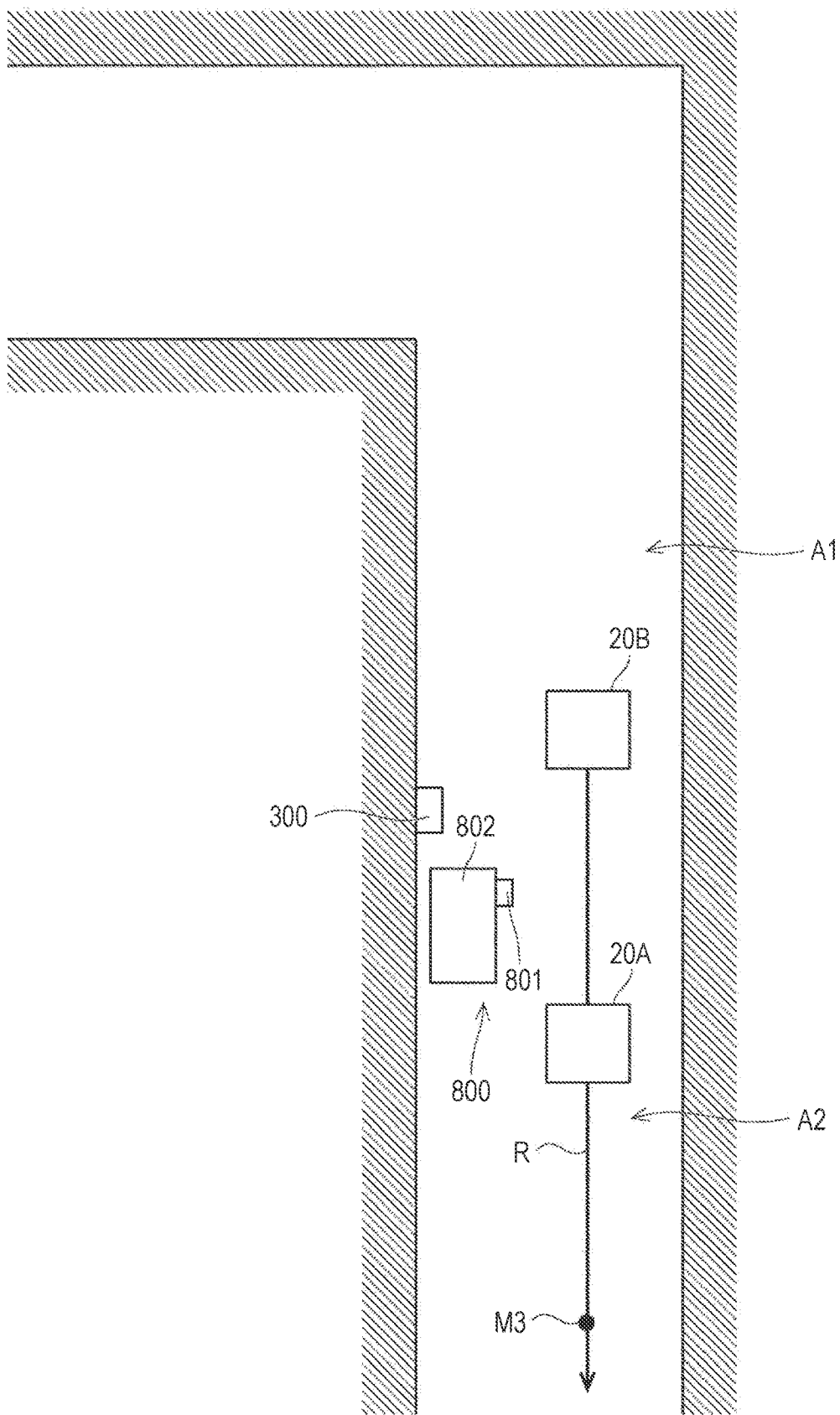
FIG. 7 is a diagram illustrating an operation of allowing mobile robots to consecutively pass through a security gate.

Then, when the mobile robot 20A passes through the security gate 800 as illustrated in FIG. 7, the mobile robot 20A transmits a passing-through completion signal to the host management device 10 (S408). At this time, since the passing-through reservation signal from the mobile robot 20B is received, the host management device 10 does not generate a closing signal. Accordingly, the gate of the security gate 800 is kept open.

Figure 8:
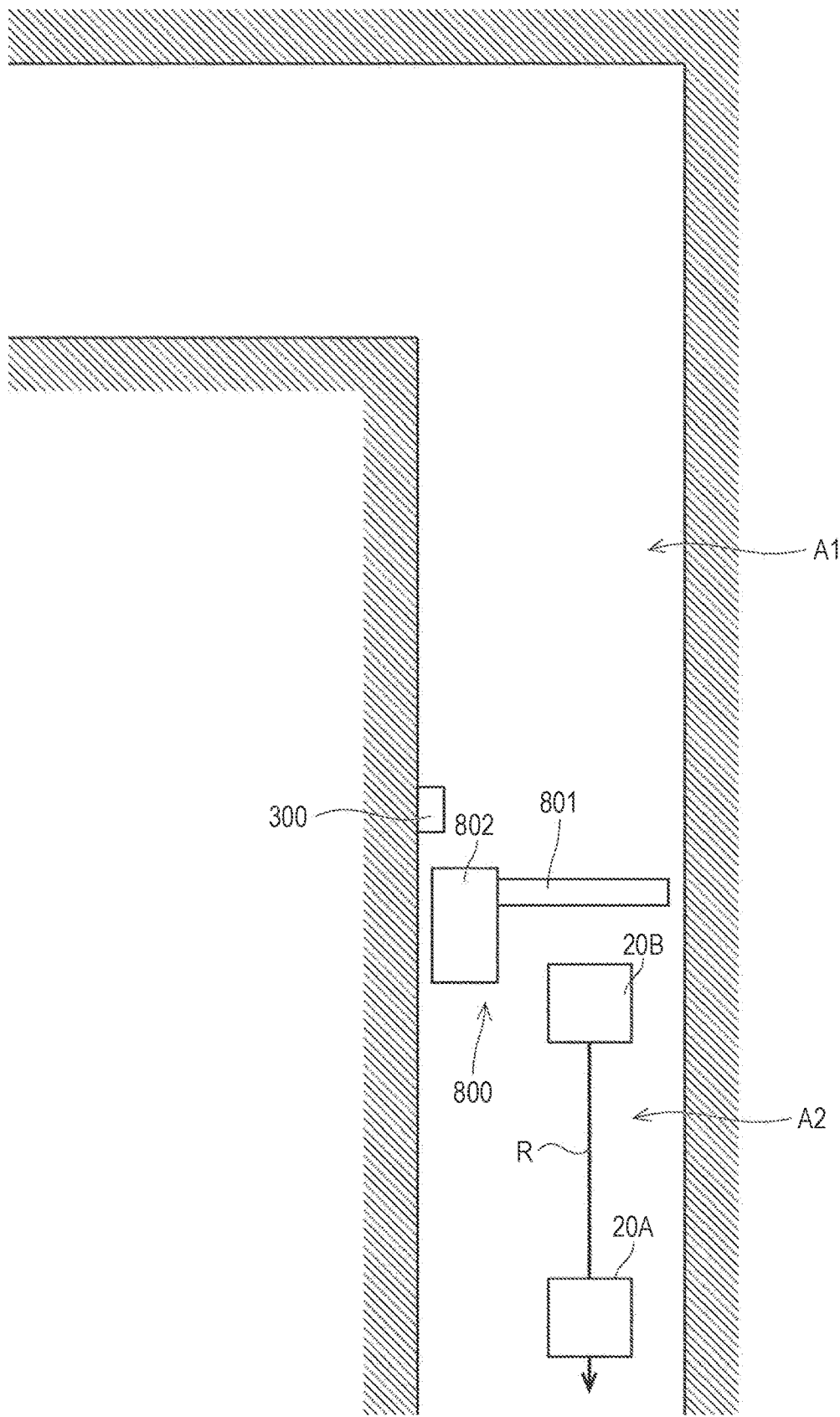
FIG. 8 is a diagram illustrating an operation of allowing mobile robots to consecutively pass through a security gate.

Then, when the mobile robot 20B arrives at the security gate 800, the mobile robot 20B transmits a passing-through start signal to the host management device 10 (S409). When the mobile robots 20A and 20B further move, the mobile robot 20B passes through the security gate 800. When the mobile robot 20B passes the security gate 800, the mobile robot 20B transmits a passing-through completion signal to the host management device 10 (S410). When the host management device 10 receives the passing-through completion signal from the mobile robot 20B, the host management device 10 transmits a closing signal to the security gate 800 (S411). Accordingly, as illustrated in FIG. 8, the security gate 800 closes the gate 801 (S412).

In this way, the host management device 10 transmits the closing signal for the security gate 800 after the passing-through completion signals have been received from all the mobile robots 20A and 20B having transmitted the passing-through reservation signals. Accordingly, until passing-through of the two mobile robots 20A and 20B having reserved the passing-through has been completed, the gate 801 is not closed. While the mobile robots 20A and 20B are passing through the security gate 800, the security gate 800 does not close the gate 801. Accordingly, a waiting time in which the mobile robot 20B waits for opening and closing of the gate is saved. Since the mobile robot 20B can rapidly pass through the security gate 800, it is possible to improve delivery efficiency.

When the host management device 10 receives the passing-through reservation signals from a plurality of mobile robots, it is possible to cause the plurality of mobile robots 20 to consecutively pass through the gate 801 while the gate 801 is being opened once. Accordingly, two or more mobile robots 20 can consecutively pass through the security gate 800. It is possible to improve delivery efficiency. It is possible to decrease a waiting time of a mobile robot 20. The number of mobile robots 20 consecutively passing through the security gate 800 may be three or more.

In the above description, the mobile robots 20A and 20B transmit the passing-through reservation signal at a timing at which the moving distance to the security gate 800 reaches a predetermined distance. Alternatively, the mobile robots 20A and 20B may transmit the passing-through reservation signal at a timing at which a moving time to the security gate 800 reaches a predetermined time. For example, each mobile robot 20 may estimate the moving time based on the moving distance to the security gate 800 and a moving speed thereof. At a timing at which the estimated moving time becomes equal to or less than a predetermined threshold value, the mobile robot 20 may transmit the passing-through reservation signal. The host management device 10 may change the threshold value for the moving distance or the moving time depending on a degree of congestion or conditions in the facility.

The position or timing at which the mobile robot 20B transmits the passing-through reservation signal may be the same as or different from the position or timing at which the mobile robot 20A transmits the passing-through reservation signal. For example, the transmission position can be changed depending on the types of the mobile robots 20A and 20B, the delivery objects, or the moving speeds. For example, the threshold value for the moving distance or the moving time can be set to be larger for a mobile robot 20 with a high moving speed. A plurality of threshold values for the moving distance or the moving time may be set in the robot control parameter of the mobile robot 20. The threshold value may be set in stages and the threshold value may be changed based on the degree of congestion in the facility or the moving speed by the host management device 10.

A transmission point or a transmission area in which the passing-through reservation signal is transmitted may be correlated in the floor map 121 in advance. For example, when a waiting area for a mobile robot 20 is provided near the security gate 800, the waiting area may be set as the transmission area. When a mobile robot 20 moves into the transmission area, the mobile robot 20 may transmit the passing-through reservation signal.

The signal generating unit 219 of each of the mobile robots 20A and 20B can generate the passing-through reservation signal, the passing-through start signal, and the passing-through completion signal at appropriate timings. For example, when each of the mobile robots 20A and 20B detects its current position, the passing-through reservation signal, the passing-through start signal, and the passing-through completion signal can be generated based on the current position. At a time point at which the current position reaches a predetermined transmission point or a predetermined transmission area on the floor map 221, the mobile robots 20A and 20B can transmit various signals to the host management device 10.

The position or timing at which the passing-through start signal or the passing-through completion signal is transmitted can be determined based on the position of the mobile robot 20 relative to the security gate 800 or the distance to the security gate 800. For example, the distance sensor group 24 may detect the distance to the security gate 800 and the mobile robot 20 may transmit the signal when the detected distance reaches a predetermined value. Alternatively, a radio tag such as a radio frequency identifier (RFID) tag or a near-field communication (NFC) tag may be provided in the mobile robot 20. The mobile robot 20 may transmit the passing-through start signal at a timing at which the tag can be read by a tag reader which is provided in the security gate 800 or in the vicinity thereof.

At least one of the passing-through reservation signal, the passing-through start signal, and the passing-through completion signal may be generated by a device other than a mobile robot 20. A mobile robot 20 may transmit information indicating a current position thereof to the host management device 10 and the host management device 10 may generate various signals based on the current position.

Alternatively, the security gate 800 or the environmental camera 300 may generate the passing-through reservation signal, the passing-through start signal, and the passing-through completion signal. A current position of a mobile robot 20 may be detected based on information acquired from the security gate 800 or the environmental camera 300. A current position of a mobile robot may be detected from an image captured by the environmental camera 300. Alternatively, a radio tag may be provided in a mobile robot 20 and a radio tag reader may be attached to the security gate 800 or the vicinity thereof. When the radio tag reader receives radio waves from the radio tag, the current position may be detected. The current position may be detected in combination of such methods.

The security gate 800 or the host management device 10 may determine whether mobile robots 20 have passed through the security gate 800 in the order in which the passing-through reservation signals have been received. That is, the host management device 10 may determine whether the order of receiving the passing-through reservation signals and the passing-through order match each other. For example, it is assumed that the mobile robot 20B transmits the passing-through reservation signal after the mobile robot 20A has transmitted the passing-through reservation signal. In this case, after the mobile robot 20A has passed through the security gate 800, it is determined whether the mobile robot 20B has passed through the security gate 800.

When the passing-through order and the signal transmitting order match each other, it is determined that the operations of the mobile robots 20 are appropriately controlled. When the passing-through order and the signal transmitting order do not match, it is determined that the operations of the mobile robots 20 are not appropriately controlled. For example, an error can be thought to occur in the mobile robot 20A. Accordingly, since it is possible to rapidly resolve an error, it is possible to improve delivery efficiency.

Opening-Closing Operation Example 2

Figure 9:
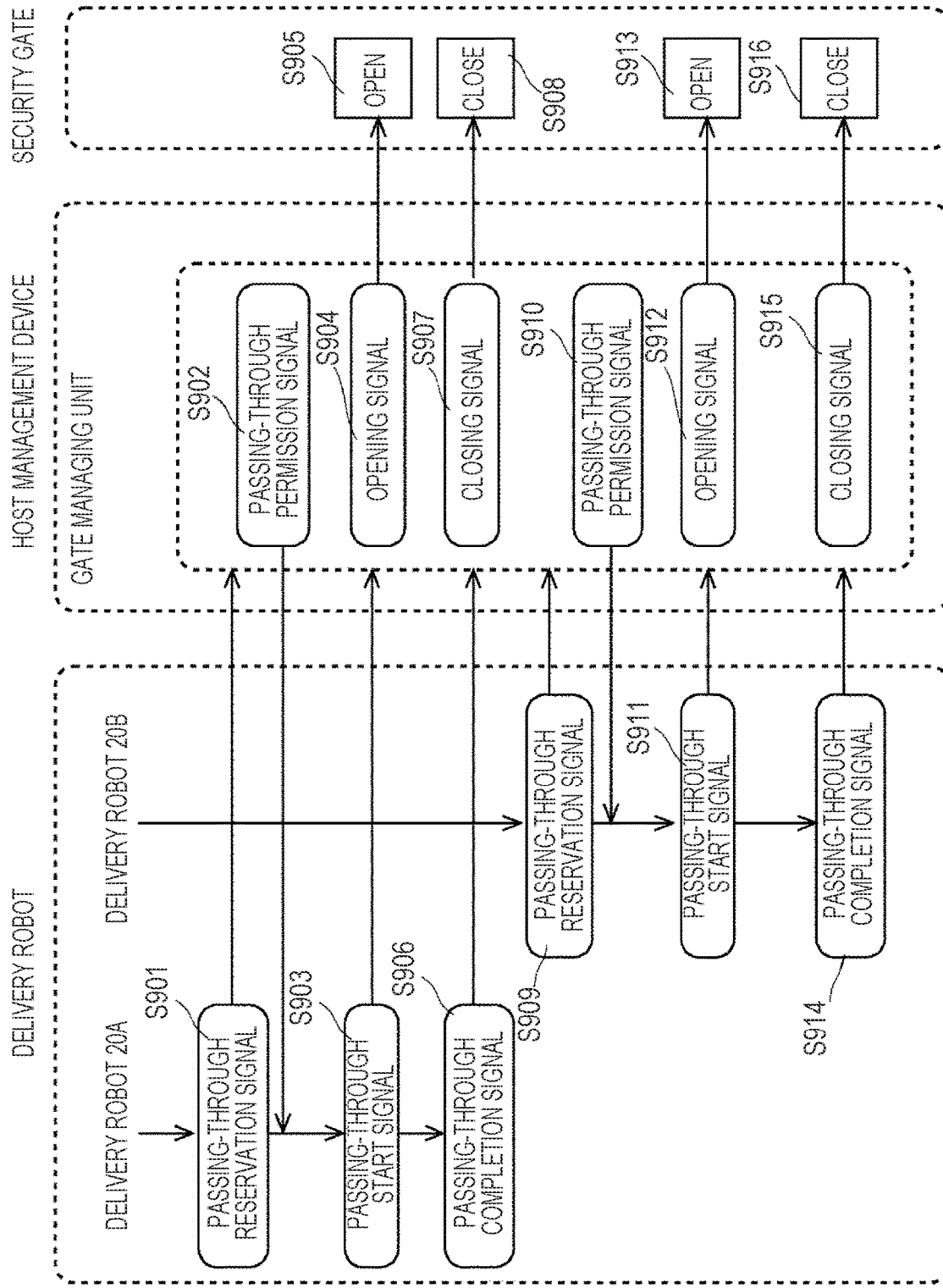
FIG. 9 is a timing chart illustrating Operation Control Example 2 according to the embodiment.

Opening-closing Operation Example 2 will be described below with reference to FIGS. 9 to 15. In Opening-closing Operation Example 2, the security gate 800 is closed between the passing-through timing of the mobile robot 20A and the passing-through timing of the mobile robot 20B. FIG. 9 is a timing chart illustrating transmission and reception of signals between various devices. FIGS. 10 to 15 are diagrams schematically illustrating a control operation of allowing a mobile robot 20 to pass through the security gate 800. Specifically, FIGS. 10 to 15 are top views schematically illustrating the surroundings of the security gate 800.

In FIGS. 10 to 15, two mobile robots 20A and 20B pass through the security gate 800. In Opening-closing Operation Example 2, the mobile robot 20B is separated more apart from the mobile robot 20A in comparison with Opening-closing Operation Example 1 illustrated in FIG. 5 and the like. Until the mobile robot 20B moves to the security gate 800 after the mobile robot 20A has passed through the security gate 800, the security gate 800 closes the gate 801. The other configurations in Opening-closing Operation Example 2 are the same as in Opening-closing Operation Example 1 and thus description thereof will be appropriately omitted.

Figure 10:
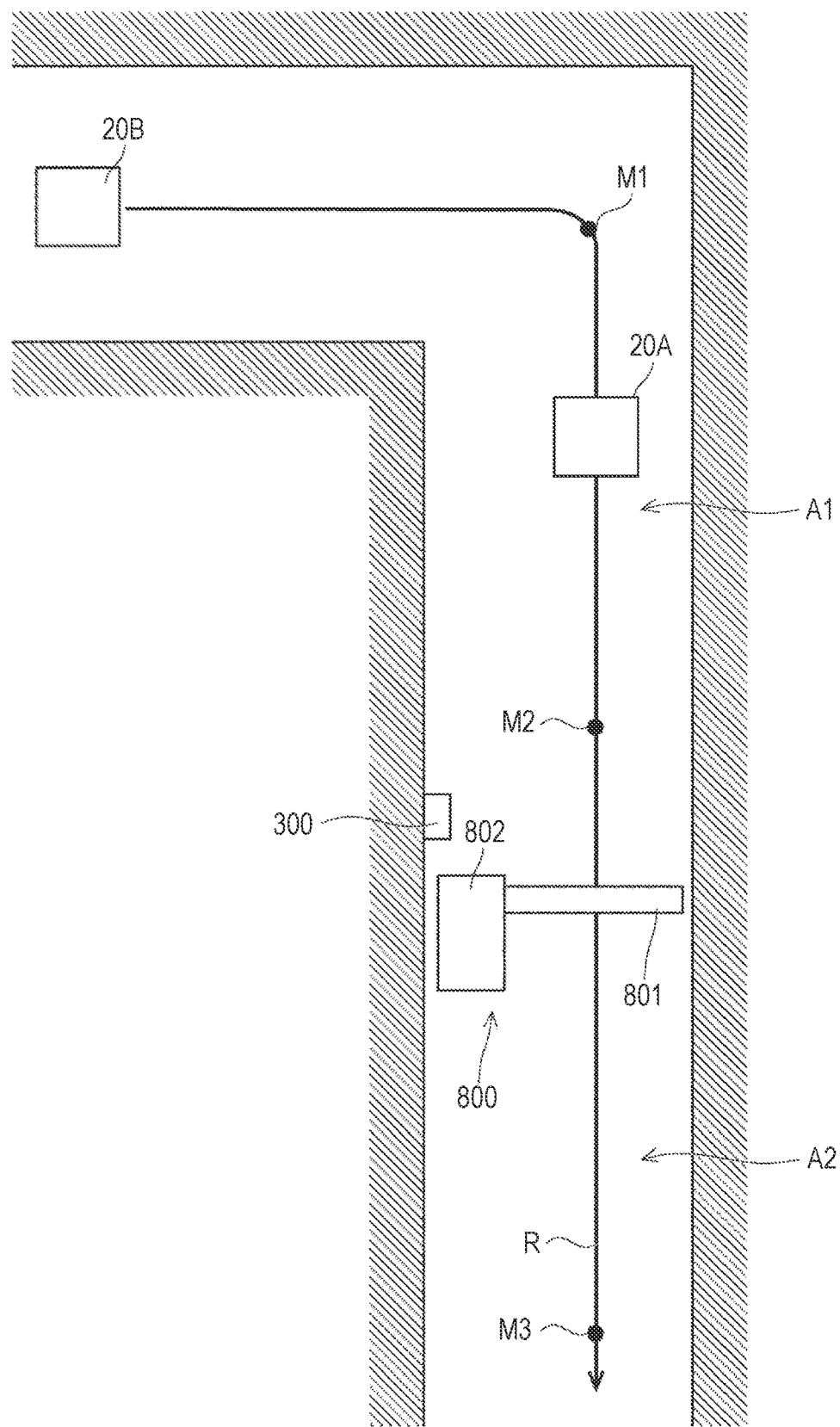
FIG. 10 is a diagram illustrating an operation in Operation Control Example 2.

First, in the stage illustrated in FIG. 10, the mobile robot 20A transmits a passing-through reservation signal to the host management device 10 (S901). For example, when a moving distance from a current position of the mobile robot 20A to the security gate 800 is equal to or less than a predetermined distance, the signal generating unit 219 of the mobile robot 20A generates the passing-through reservation signal. The communication unit 23 transmits the passing-through reservation signal to the host management device 10. Accordingly, the mobile robot 20A can reserve passing through the security gate 800. The passing-through reservation signal may include a robot ID of the mobile robot 20A, a scheduled passing-through time, delivery object information, or authentication data. When the passing-through reservation signal is received from the mobile robot 20A, the host management device 10 transmits a passing-through permission signal to the mobile robot 20A (S902).

Figure 11:
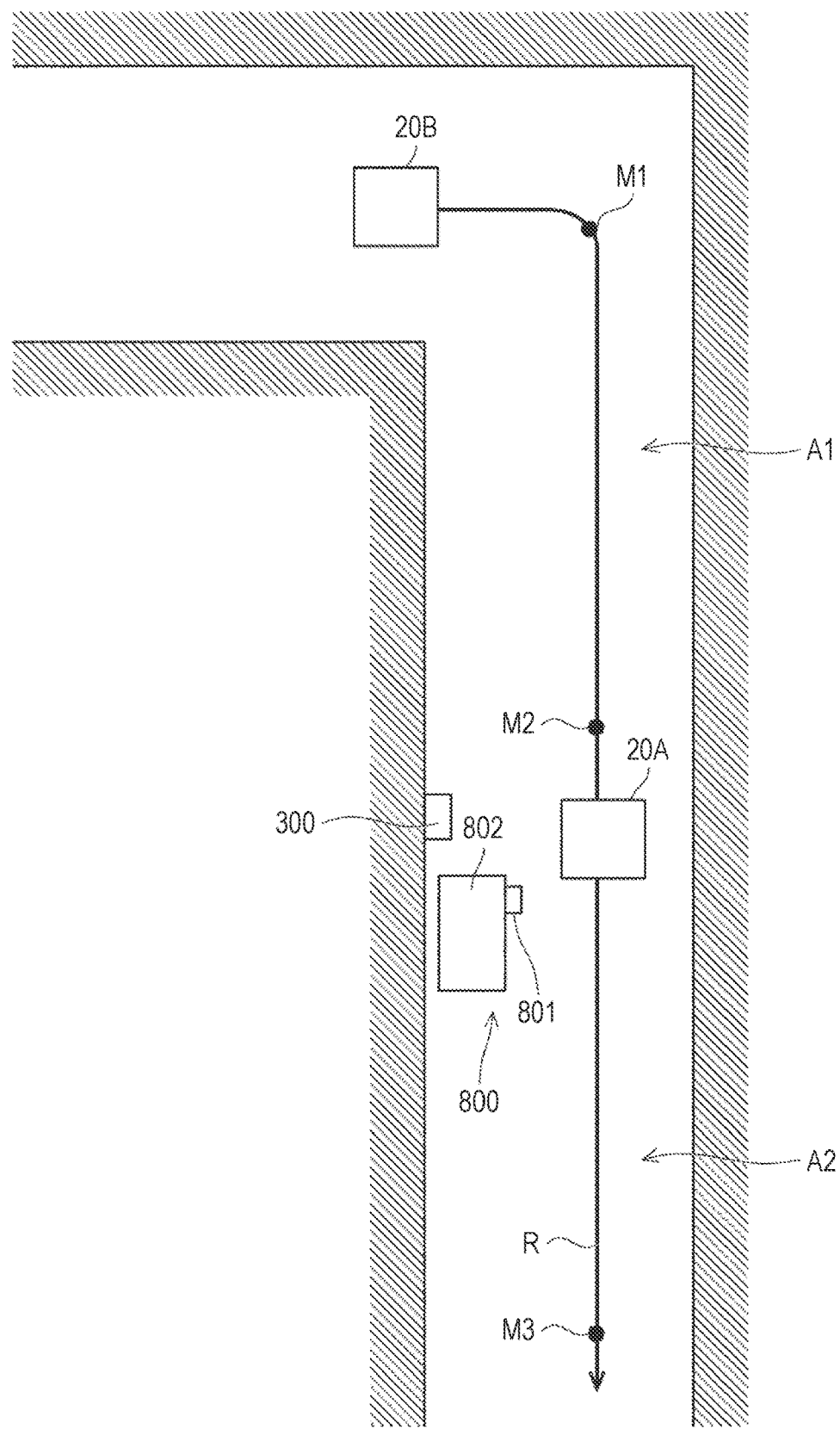
FIG. 11 is a diagram illustrating an operation in Operation Control Example 2.

The mobile robot 20A and the mobile robot 20B move to the security gate 800. When the mobile robot 20A arrives at the security gate 800, the mobile robot 20A transmits a passing-through start signal to the host management device 10 (S903). The host management device 10 transmits an opening signal to the security gate 800 (S904). Accordingly, as illustrated in FIG. 11, the security gate 800 opens the gate 801 (S905).

Figure 12:
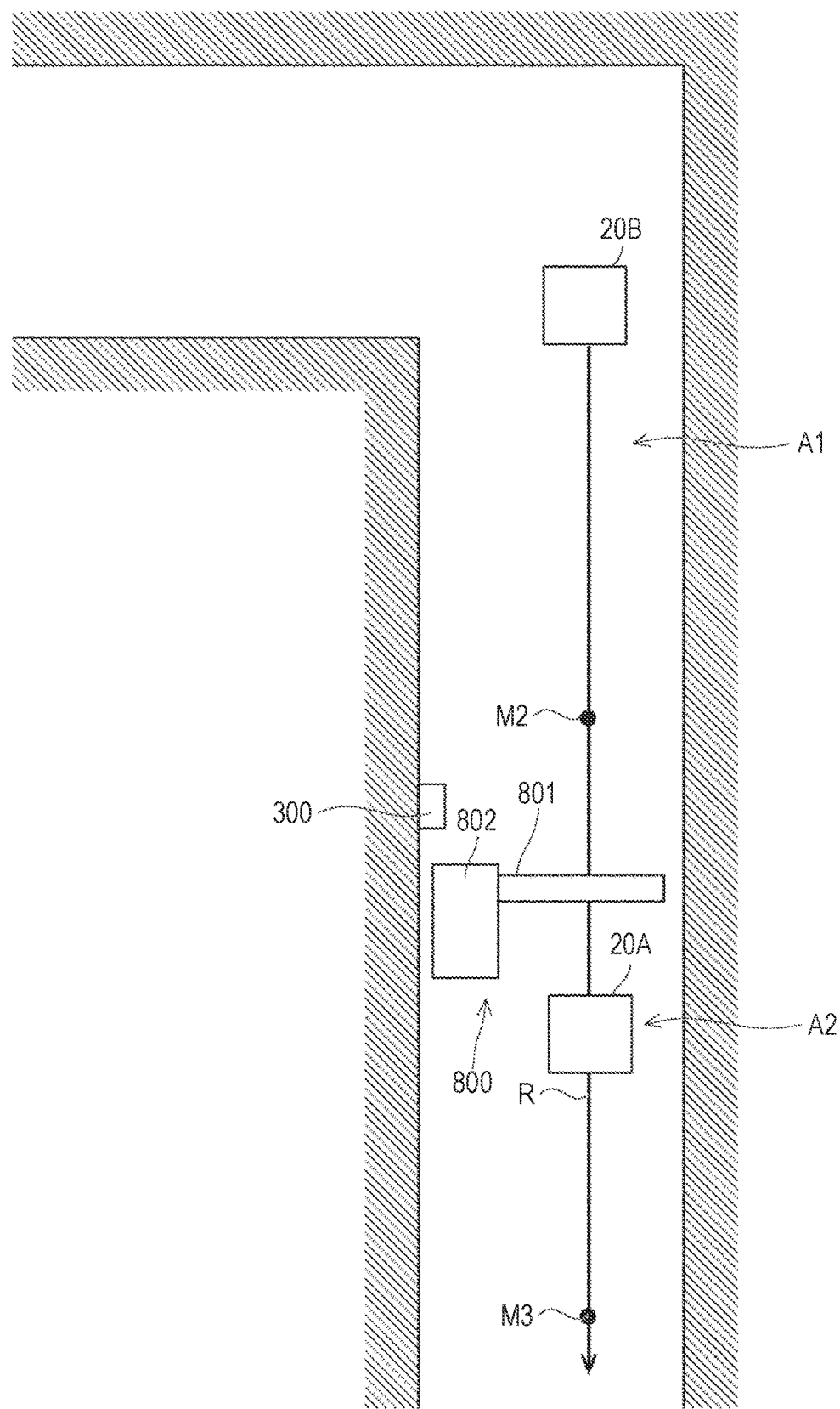
FIG. 12 is a diagram illustrating an operation in Operation Control Example 2.

Then, when the mobile robots 20A and 20B further move, the mobile robot 20A passes through the security gate 800. Accordingly, the mobile robot 20A transmits a passing-through completion signal to the host management device 10 (S906). At this time, since the passing-through reservation signal from the mobile robot 20B is not received, the host management device 10 transmits a closing signal for the security gate 800 (S907). Accordingly, as illustrated in FIG. 12, the security gate 800 closes the gate 801 (S908).

Figure 13:
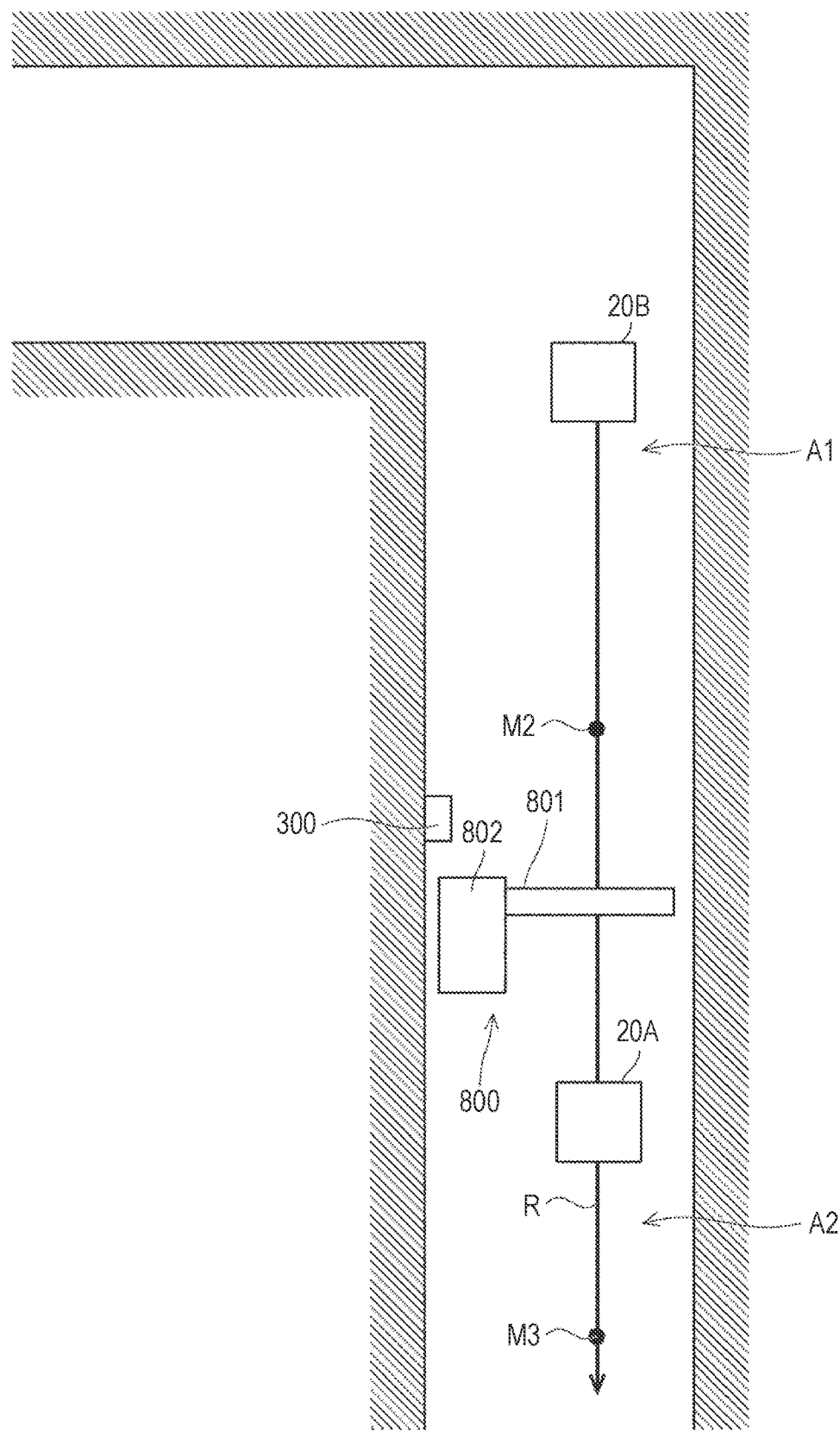
FIG. 13 is a diagram illustrating an operation in Operation Control Example 2.

When the mobile robot 20B moves to the position illustrated in FIG. 13, the mobile robot 20B transmits a passing-through reservation signal to the host management device 10 (S909). When a moving distance from a current position of the mobile robot 20B to the security gate 800 is equal to or less than a predetermined distance, the signal generating unit 219 of the mobile robot 20B generates the passing-through reservation signal. Then, the communication unit 23 transmits the passing-through reservation signal to the host management device 10. Accordingly, the mobile robot 20B can reserve passing through the security gate 800. When the passing-through reservation signal from the mobile robot 20B is received, the host management device 10 transmits a passing-through permission signal to the mobile robot 20B (S910).

Figure 14:
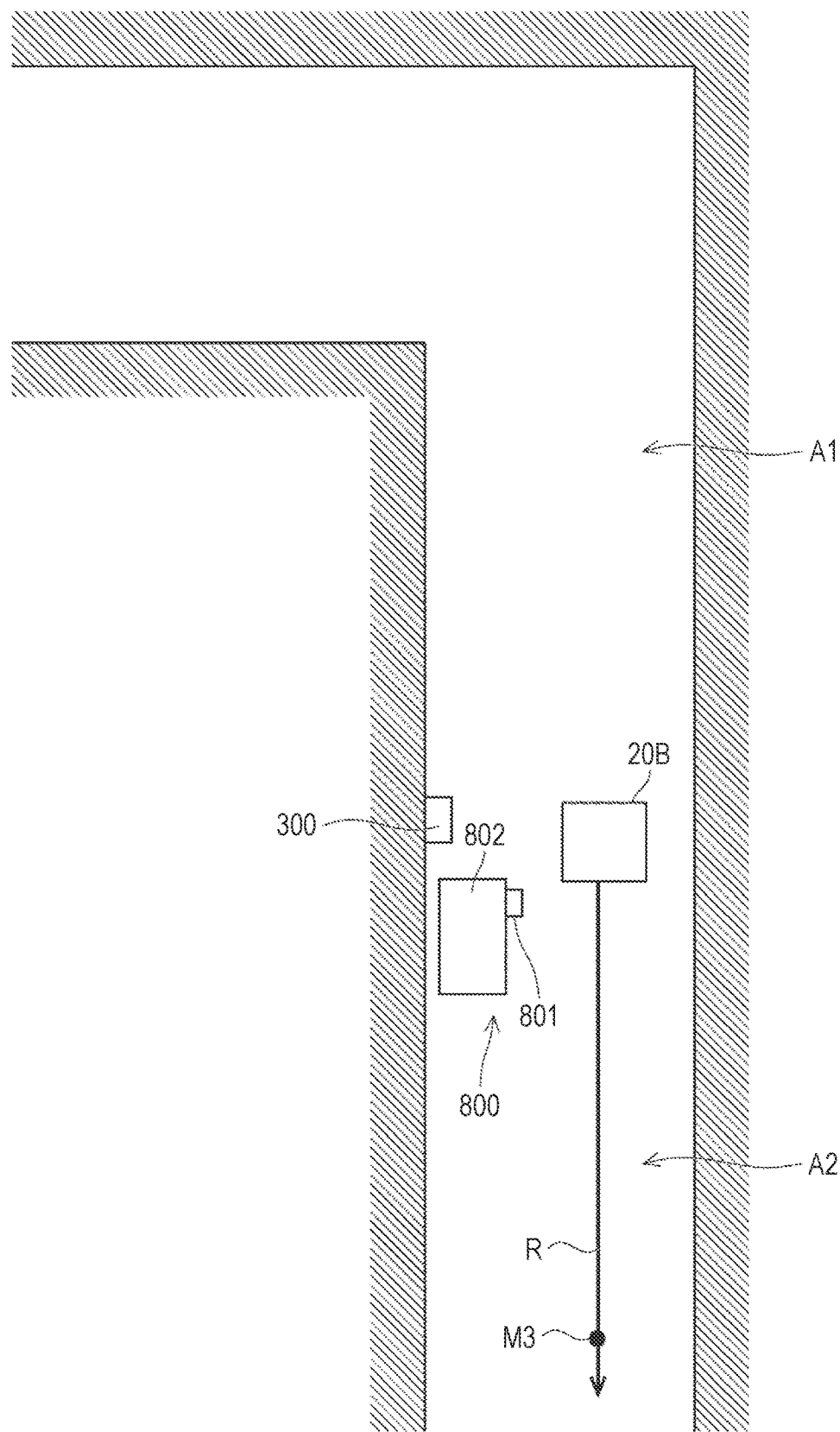
FIG. 14 is a diagram illustrating an operation in Operation Control Example 2.

When the mobile robot 20B arrives at the security gate 800, the mobile robot 20B transmits a passing-through start signal to the host management device 10 (S911). Accordingly, the host management device 10 transmits an opening signal to the security gate 800 (S912). Accordingly, as illustrated in FIG. 14, the security gate 800 opens the gate 801 (S913). In FIG. 14, the mobile robot 20A moves to the outside of the drawing and thus is not illustrated.

Figure 15:
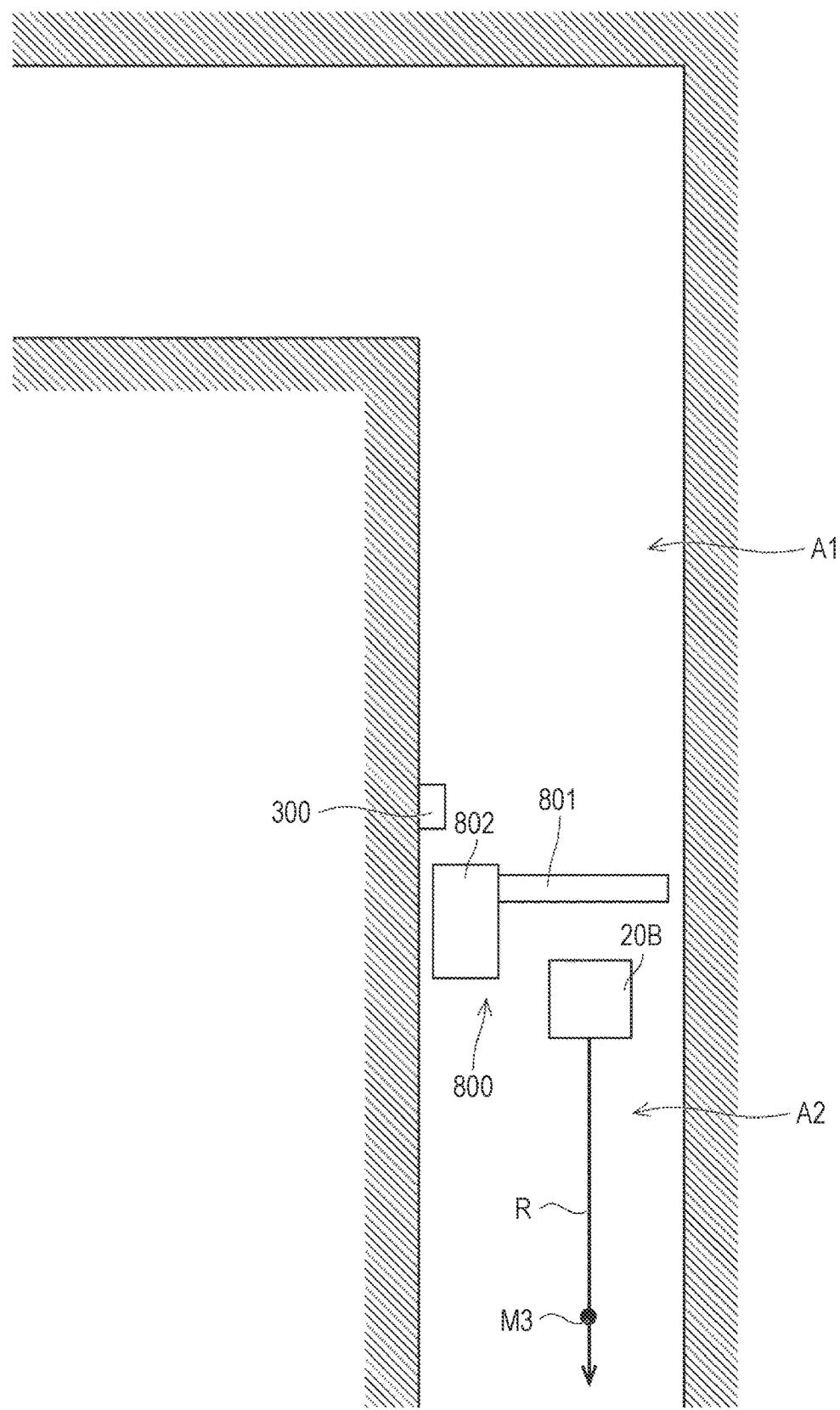
FIG. 15 is a diagram illustrating an operation in Operation Control Example 2.

Then, when the mobile robot 20B moves, the mobile robot 20B passes through the security gate 800. When the mobile robot 20B passes through the security gate 800, the mobile robot 20B transmits a passing-through completion signal to the host management device 10 (S914). When the host management device 10 receives the passing-through completion signal from the mobile robot 20B, the host management device 10 transmits a closing signal to the security gate 800 (S915). Accordingly, as illustrated in FIG. 15, the security gate 800 closes the gate 801 (S916).

In this way, when two mobile robots 20A and 20B move separately, the security gate 800 closes the gate 801 between the passing-through timing of the mobile robot 20A and the passing-through timing of the mobile robot 20B. It is possible to prevent a person whose passing through the security gate 800 is not permitted from passing through the security gate 800. Accordingly, it is possible to improve security. Particularly, in a medial and welfare facility such as a hospital, general users such as patients and visitors thereof move as well as staffs or patients. Entrance of a general user into a restricted area A2 is restricted. Accordingly, it is possible to prevent a general user from erroneously passing through the security gate 800.

Modified Example 1

In Modified Example 1, the passing-through order of the mobile robots 20A and 20B is determined based on predetermined priority. For example, the priority is determined based on delivery object information or route plans. Modified Example 1 will be described below described with reference to FIGS. 16 to 19. The processes of transmitting the passing-through reservation signal, the passing-through start signal, and the passing-through completion signal are the same as described above and thus description thereof will be omitted.

In FIGS. 16 to 19, the movement directions of the mobile robot 20A and the mobile robot 20B are opposite to each other. Specifically, the mobile robot 20A moves from the restricted area A2 to the unrestricted area A1. The mobile robot 20B moves from the unrestricted area A1 to the restricted area A2. Specifically, the mobile robot 20A moves along a route RA in the order of transit points M11, M12, and M13. The mobile robot 20B moves along a route RB in the order of transit points M21 and M22.

Figure 16:
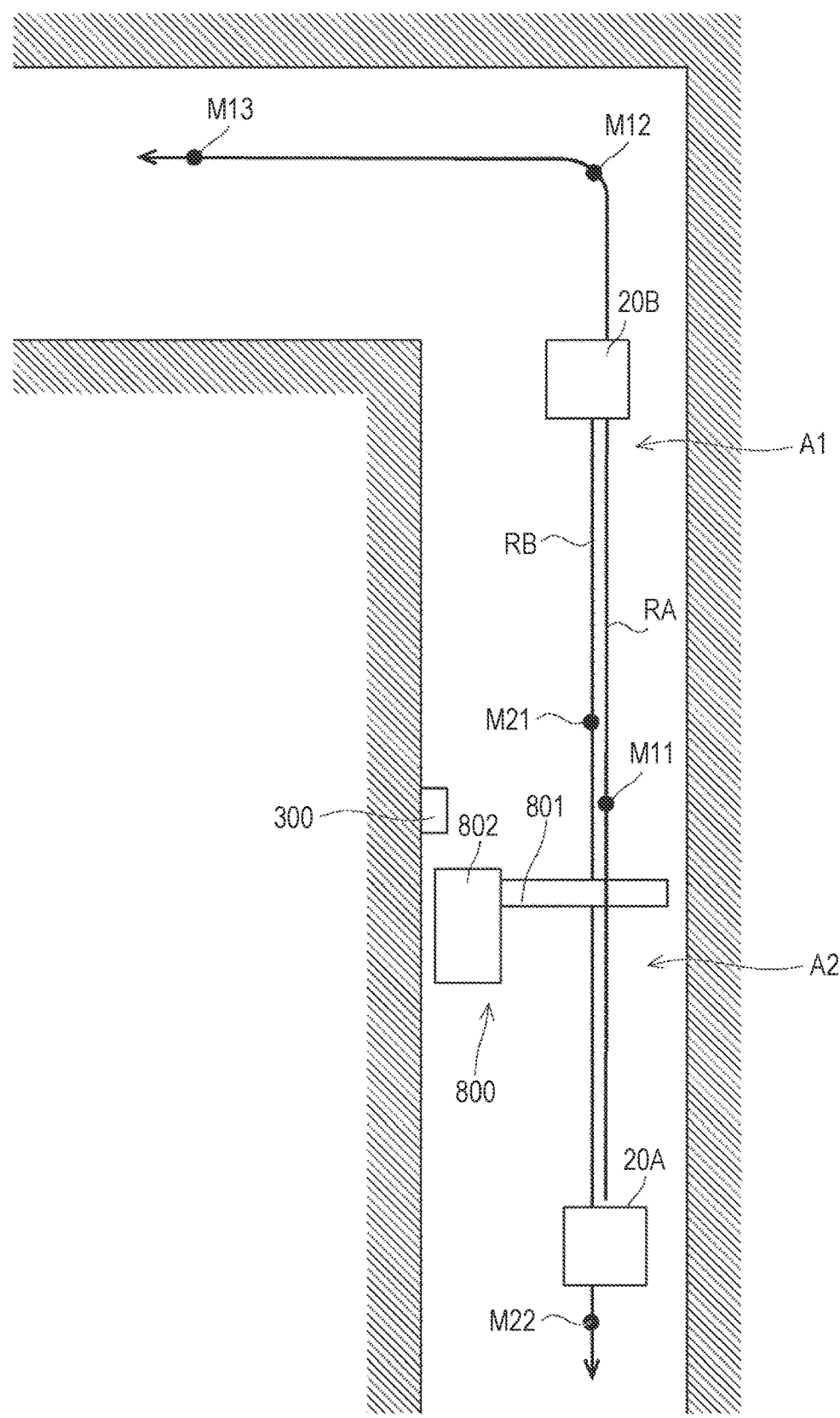
FIG. 16 is a diagram illustrating an operation in Modified Example 1.

In FIG. 16, the mobile robot 20A moves closer to the security gate 800 than the mobile robot 20B. That is, the distance from the mobile robot 20A to the security gate 800 is less than the distance from the mobile robot 20B to the security gate 800. In the stage illustrated in FIG. 16, both the mobile robot 20A and the mobile robot 20B have transmitted the passing-through reservation signal.

Here, the host management device 10 performs control such that the mobile robot 20B passes through the security gate 800 earlier than the mobile robot 20A. For example, when two or more passing-through reservation signals are received, the host management device 10 determines the passing-through order based on delivery object information or route plans. Information for determining the passing-through order may be included in the passing-through reservation signal. Alternatively, the priority for passing-through may be determined based on various types of information stored in the storage unit 12.

The host management device 10 performs mediation for causing the mobile robot 20B to pass early. For example, the host management device 10 may not transmit a passing-through permission signal to the mobile robot 20A. Alternatively, the host management device 10 may transmit a cancellation signal for cancelling out permission after the passing-through permission signal has been transmitted to the mobile robot 20A. That is, the host management device 10 notifies the mobile robot 20A other than the first mobile robot 20B of cancellation of passing-through permission after the passing-through order has been determined. For example, the gate managing unit 119 performs the processes for determining the passing-through order and generating a cancellation signal.

Figure 17:
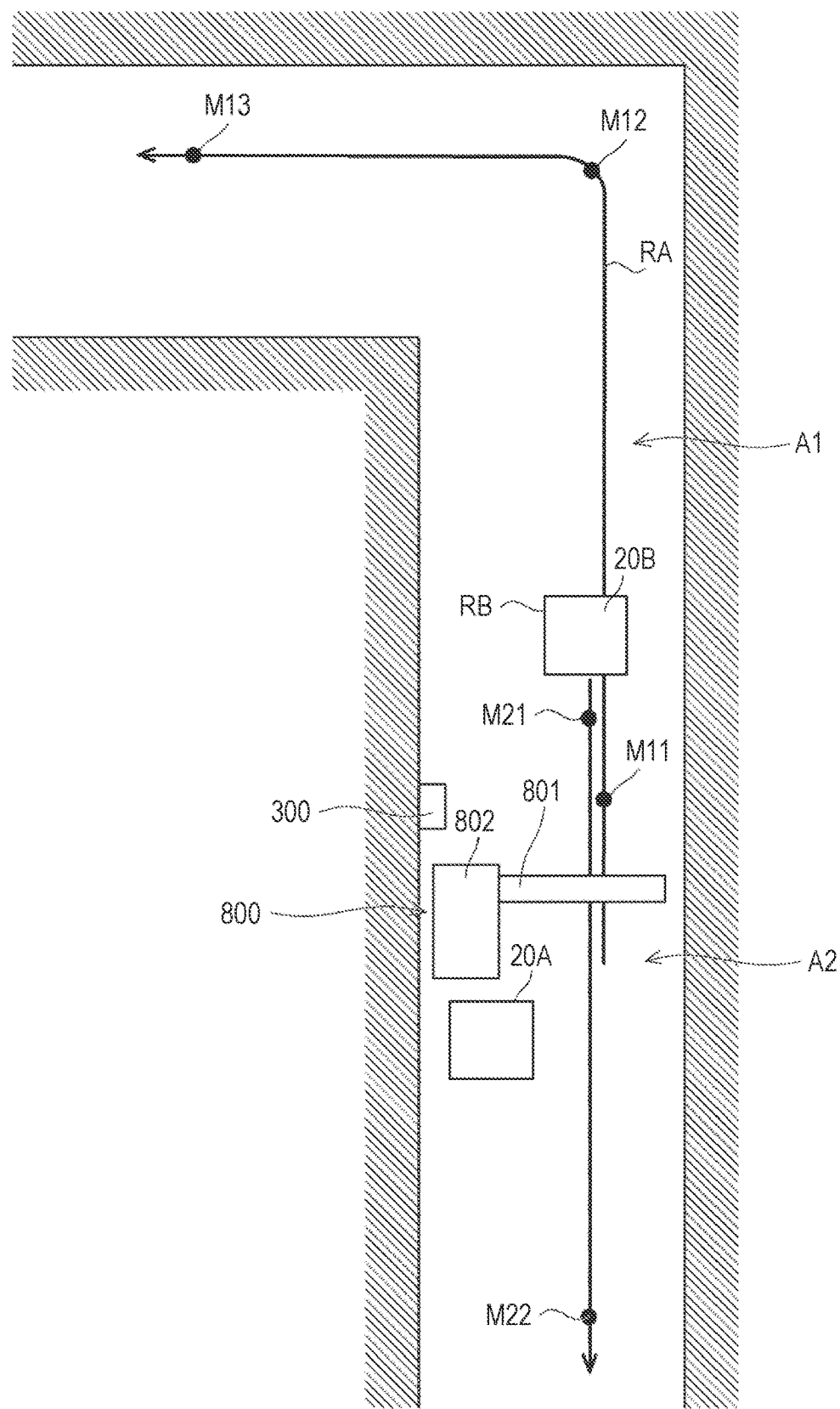
FIG. 17 is a diagram illustrating an operation in Modified Example 1.

When the cancellation signal has been received or when the passing-through permission signal has not been received, the mobile robot 20A waits before the security gate 800 as illustrated in FIG. 17. At this time, the mobile robot 20A waits at a position at which passing-through of another mobile robot 20B is not hindered. In FIG. 17, the mobile robot 20A is shifted to the left side from the route RA. That is, the mobile robot 20A waits close to the body unit 802. Even when the mobile robot 20A moves before the security gate 800, the mobile robot 20A does not transmit the passing-through start signal.

Figure 18:
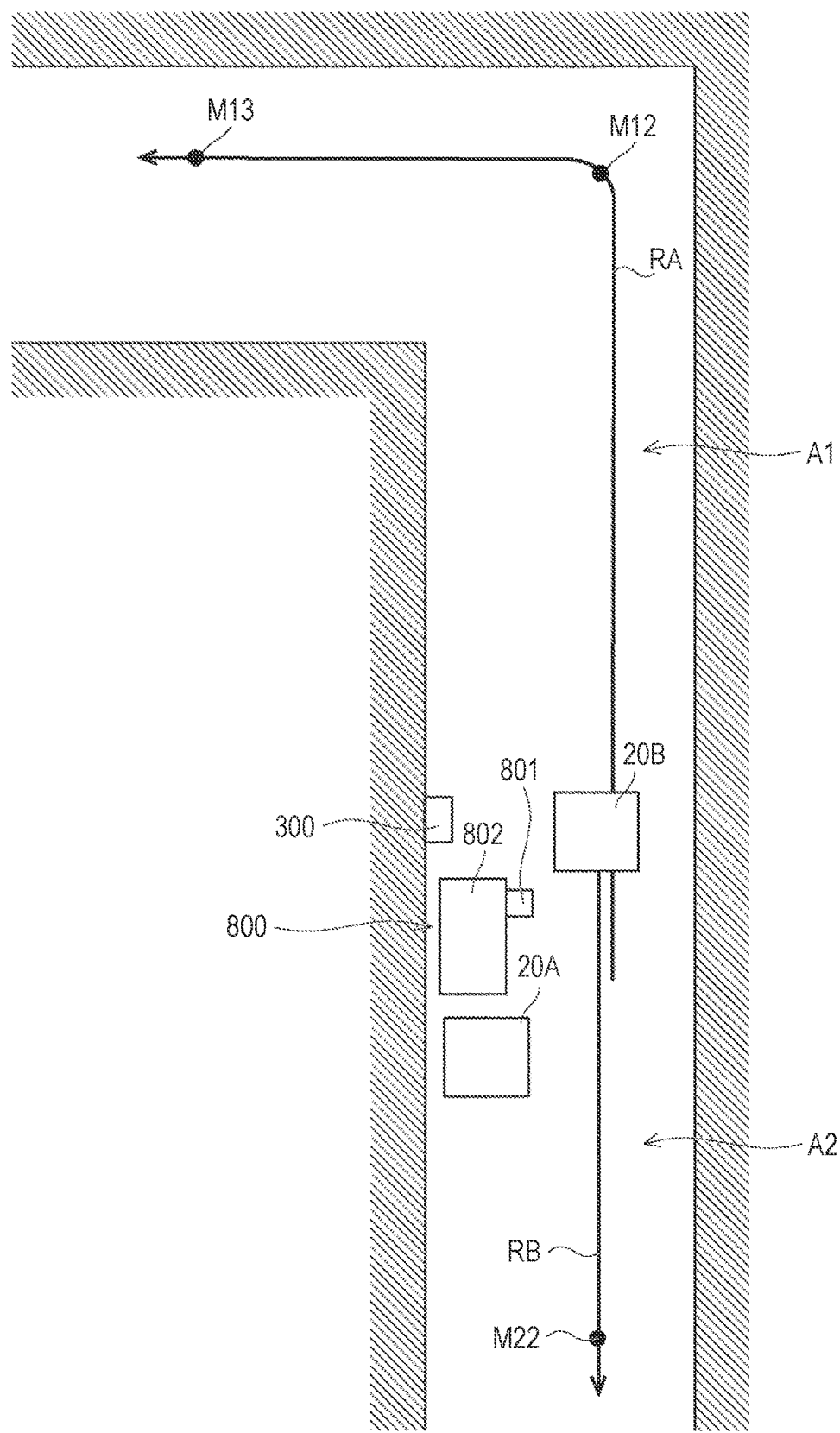
FIG. 18 is a diagram illustrating an operation in Modified Example 1.

When the mobile robot 20B further moves and arrives at the security gate 800, the mobile robot 20B transmits the passing-through start signal. Accordingly, as illustrated in FIG. 18, the security gate 800 opens the gate 801. In the meantime, the mobile robot 20A waits at the waiting position and does not move.

Figure 19:
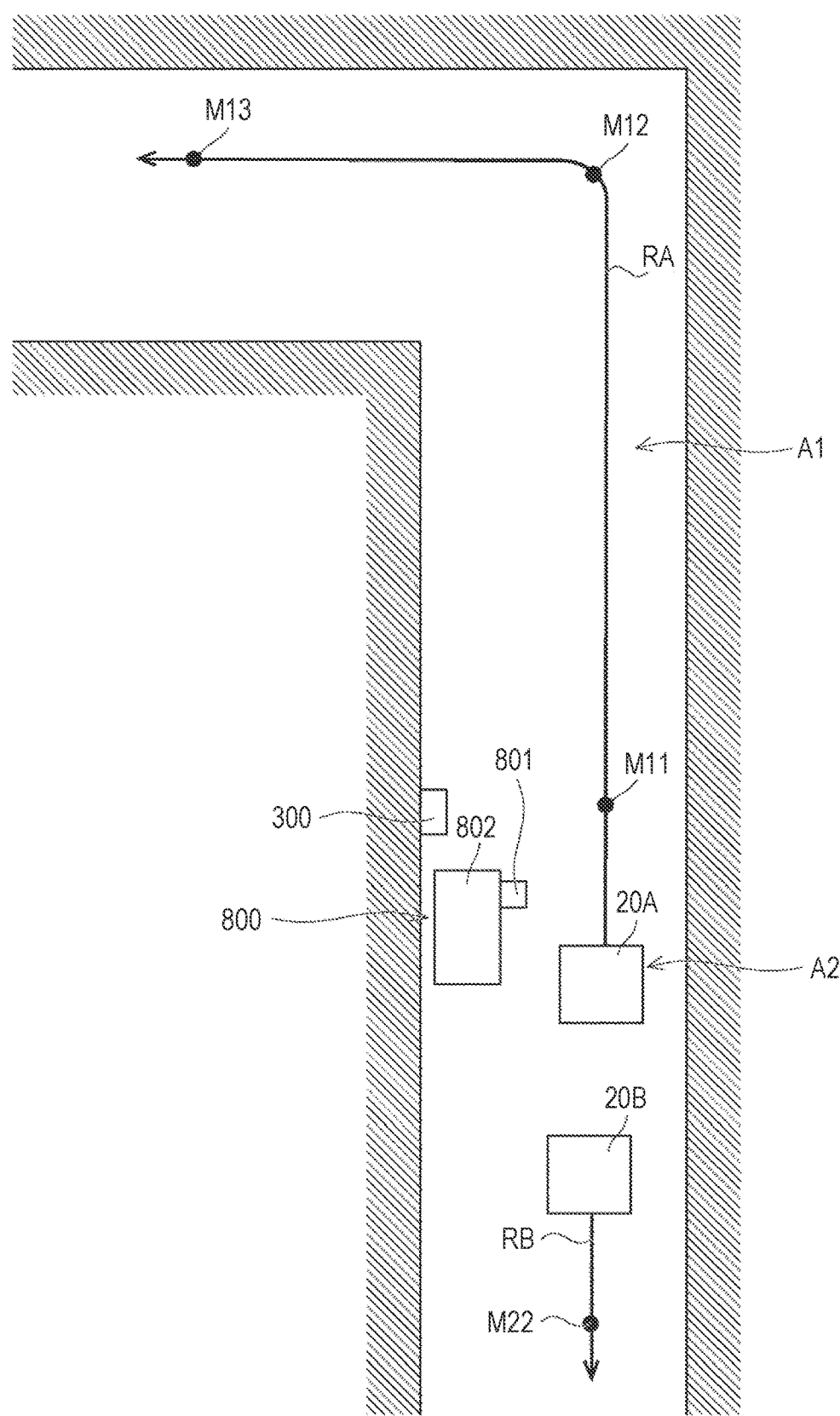
FIG. 19 is a diagram illustrating an operation in Modified Example 1.

Then, when the mobile robot 20B passes through the security gate 800, the mobile robot 20B transmits the passing-through completion signal to the host management device 10. When the passing-through completion signal from the mobile robot 20B with high priority is received, the host management device 10 transmits the passing-through permission signal to the mobile robot 20A. Accordingly, as illustrated in FIG. 19, the mobile robot 20A starts passing through the security gate 800. The mobile robot 20A transmits the passing-through start signal to the host management device 10. Accordingly, the mobile robot 20A returns to the route RA.

Figure 20:
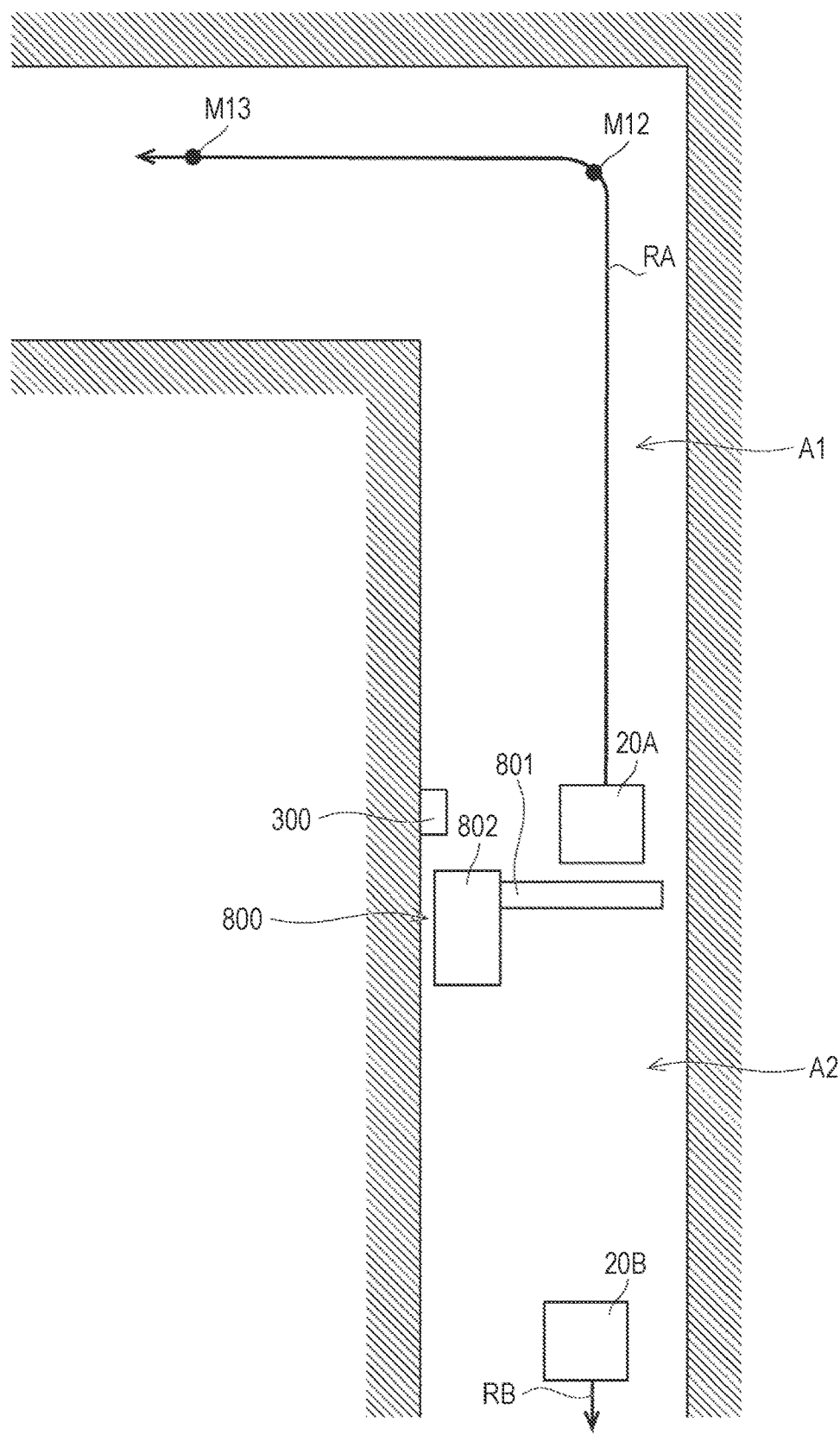
FIG. 20 is a diagram illustrating an operation in Modified Example 1.

When the mobile robots 20A and 20B further move, the mobile robot 20A passes through the security gate 800. When the mobile robot 20A transmits the passing-through completion signal to the host management device 10, the security gate 800 closes the gate 801 as illustrated in FIG. 20. In Modified Example 1, the host management device 10 can determine the passing-through order. Accordingly, optimal delivery suitable for the conditions can be performed.

Here, the mobile robots 20A and 20B transmit the passing-through reservation signal to the host management device 10. Before the mobile robot 20A and the mobile robot 20B have completely pass through the security gate 800, two passing-through reservation signals are received by the host management device 10. Accordingly, while the security gate 800 opens the gate 801 once, the mobile robots 20A and 20B can consecutively pass through the security gate 800. Accordingly, it is possible to efficiently deliver an object.

The host management device 10 transmits the passing-through permission signal or the cancellation signal thereof to the mobile robots 20. Accordingly, it is possible to easily change the passing-through order of the mobile robots 20. For example, the host management device 10 transmits the cancellation signal for cancelling out the passing-through permission to the mobile robot with low priority in the passing-through order. The host management device 10 retransmits the passing-through permission signal at a timing at which the mobile robot 20 having transmitted the cancellation signal passes through the security gate 800. Accordingly, it is possible to easily mediate the passing-through order. The host management device 10 may add information indicating the passing-through order to the passing-through permission signal. In this case, the mobile robot 20 starts passing-through in the passing-through order thereof. That is, when a previous mobile robot in the passing-through order has completely passed through the security gate 800, the mobile robot 20 starts its passing.

In Modified Example 1, three or more mobile robots 20 may consecutively pass through the security gate 800 while the gate 801 is being opened once. That is, a mobile robot subsequent to the mobile robot 20A may pass through the security gate 800 before the security gate 800 closes the gate 801. In this case, it is also possible to arbitrarily change the passing-through order.

A method of determining the priority for passing-through is not particularly restricted. For example, the host management device 10 may determine the priority based on details of delivery object information or a scheduled use time. Alternatively, the host management device 10 may determine the priority based on a distance from the security gate 800 to a destination or a transit point. Accordingly, the gate managing unit 119 can determine the passing-through order with reference to the delivery object information 126 or the route plan information 125.

The host management device 10 may estimate a degree of congestion in the facility and determine the priority based on the result of estimation. The host management device 10 can estimate a degree of congestion in the vicinity of a destination or in the movement route from images of the environmental camera 300, a robot camera, or the like. Since it takes time to pass through an area with a high degree of congestion, the host management device 10 advances the passing-through priority of the corresponding mobile robot 20. Alternatively, the host management device 10 may delay the passing-through priority of the corresponding mobile robot 20 such that the mobile robot 20 moves after the congestion has been resolved.

When a mobile robot 20 gets on an elevator, the host management device 10 may determine the passing-through order based on a degree of congestion or an operation situation of the elevator.

In the aforementioned description, the host management device 10 controls the security gate 800 and a plurality of mobile robots 20, but the mobile robots 20 and the security gate 800 may be controlled by different control devices. For example, a device that controls the mobile robots 20 and a device that controls the security gate 800 may be physically different from each other.

At least some functions of the host management device 10 may be performed by the security gate 800. A processor or a control circuit that is incorporated into the body unit 802 of the security gate 800 may serve as a control device or a control system. Accordingly, the control system according to this embodiment may be constituted by a single device or may be distributed and arranged in a plurality of devices.

The passing-through reservation signal and the passing-through start signal can also be incorporated into a single signal. For example, information on the passing-through start time may be added to the passing-through reservation signal. The security gate 800 is opened at a timing corresponding to the passing-through start time. In this case, the passing-through start signal is not necessary.

In the aforementioned description, authentication data is assigned to each mobile robot 20, but authentication data may not be assigned to each mobile robot 20. That is, an authentication process may be skipped for a mobile robot 20 having transmitted passing-through reservation conditions. Operation Examples 1 and 2 and Modified Example 1 of the aforementioned embodiment can be appropriately combined.

Some or all of the processes which are performed by the host management device 10, the security gate 800, the mobile robot 20, or the like can be realized as a computer program. Such a program may be stored in various types of non-transitory computer-readable media and be supplied to a computer. The non-transitory computer-readable medium includes various types of tangible recording media. Examples of the non-transitory computer-readable media include a magnetic recording medium (for example, a flexible disk, a magnetic type, or a hard disk drive), a magneto-optical recording medium (for example, a magneto-optical disc), a compact disc-read-only memory (CD-ROM), a CD-R, a CD-R/W, and a semiconductor memory (for example, a mask ROM, a programmable ROM (PROM), an erasable PROM (EPROM), a flash ROM, a random access memory (RAM)). The program may be supplied to a computer using various types of transitory computer-readable media. Examples of the transitory computer-readable media include an electrical signal, an optical signal, and electromagnetic waves. The transitory computer-readable media can supply a program to a computer via a wired communication line such as an electrical wire or an optical fiber or a wireless communication line.

The disclosure is not limited to the aforementioned embodiment and can be appropriately modified without departing from the gist of the disclosure. For example, a system in which a delivery robot moves autonomously in a hospital is described in the aforementioned embodiment, but the system can deliver a predetermined object as luggage in a hotel, a restaurant, an office building, an event hall, or a complex facility.

What is claimed is:

1. A control system that controls opening-closing of a security gate which is provided in a facility in which a plurality of mobile robots travels autonomously, the control system performing:
   receiving a passing-through reservation signal for passing through the security gate; and
   allowing a plurality of mobile robots to consecutively pass through the security gate while the security gate opens its gate once when passing-through reservation signals are received rom the plurality of mobile robots;
   wherein it is determined whether the plurality of mobile robots has consecutively passed through the security gate in the order in which the passing-through reservation signals have been received.

2. The control system according to claim 1, wherein the passing-through order in which the plurality of mobile robots passes through the security gate is determined based on a predetermined priority.

3. The control system according to claim 1, wherein each mobile robot transmits the passing-through reservation signal when a moving time or a moving distance from the mobile robot to the security gate is equal to or less than a predetermined value.

4. The control system according to claim 1, wherein each mobile robot transmits the passing-through reservation signal when the mobile robot has moved to a predetermined position in the facility.

5. The control system according to claim 1, wherein each mobile robot transmits a passing-through start signal when the mobile robot has arrived at the security gate, and
   wherein control is performed such that the gate of the security gate is opened in accordance with the passing-through start signal.

6. The control system according to claim 1, wherein each mobile robot transmits a passing-through completion signal indicating that passing through the security gate has been completed,
   wherein the security gate allows a first mobile robot and a second mobile robot to consecutively pass through the gate when the gate is being opened once when the passing-through reservation signal from the second mobile robot is received before the passing-through completion signal from the first mobile robot is received, and
   wherein the security gate closes the gate before the second mobile robot passes through the gate after the first mobile robot has passed through the gate when the passing-through reservation signal from the second mobile robot is not received before the passing-through completion signal from the first mobile robot is received.

7. A control method of controlling opening-closing of a security gate which is provided in a facility in which a plurality of mobile robots travels autonomously, the control method comprising:
   receiving a passing-through reservation signal for passing through the security gate; and
   allowing a plurality of mobile robots to consecutively pass through the security gate while the security gate opens its gate once when the passing-through reservation signals are received from the plurality of mobile robots;
   wherein it is determined whether the plurality of mobile robots has consecutively passed through the security gate in the order in which the passing-through reservation signals have been received.

8. The control method according to claim 7, wherein the passing-through order in which the plurality of mobile robots passes through the security gate is determined based on a predetermined priority.

9. The control method according to claim 7, wherein each mobile robot transmits the passing-through reservation signal when a moving time or a moving distance from the mobile robot to the security gate is equal to or less than a predetermined value.

10. The control method according to claim 7, wherein each mobile robot transmits the passing-through reservation signal when the mobile robot has moved to a predetermined position in the facility.

11. The control method according to claim 7, wherein each mobile robot transmits a passing-through start signal when the mobile robot has arrived at the security gate, and
wherein control is performed such that the gate of the security gate is opened in accordance with the passing-through start signal.

12. The control method according to claim 7, wherein each mobile robot transmits a passing-through completion signal indicating that passing through the security gate has been completed,
wherein the security gate allows a first mobile robot and a second mobile robot to consecutively pass through the gate when the gate is being opened once when the passing-through reservation signal from the second mobile robot is received before the passing-through completion signal from the first mobile robot is received, and
wherein the security gate closes the gate before the second mobile robot passes through the gate after the first mobile robot has passed through the gate when the passing-through reservation signal from the second mobile robot is not received before the passing-through completion signal from the first mobile robot is received.

13. A non-transitory computer readable medium storing program instructions causing a computer to perform a control method of controlling opening-closing of a security gate which is provided in a facility in which a plurality of mobile robots travels autonomously, the control method comprising:
receiving a passing-through reservation signal for passing through the security gate; and
allowing a plurality of mobile robots to consecutively pass through the security gate while the security gate opens its gate once when passing-through reservation signals are received from the plurality of mobile robots;
wherein it is determined whether the plurality of mobile robots has consecutively passed through the security gate in the order in which the passing-through reservation signals have been received.

14. The non-transitory computer readable medium according to claim 13, wherein the passing-through order in which the plurality of mobile robots passes through the security gate is determined based on a predetermined priority.

15. The non-transitory computer readable medium according to claim 13, wherein each mobile robot transmits the passing-through reservation signal when a moving time or a moving distance from the mobile robot to the security gate is equal to or less than a predetermined value.

16. The non-transitory computer readable medium according to claim 13, wherein each mobile robot transmits the passing-through reservation signal when the mobile robot has moved to a predetermined position in the facility.

17. The non-transitory computer readable medium according to claim 13, wherein each mobile robot transmits a passing-through start signal when the mobile robot has arrived at the security gate, and
wherein control is performed such that the gate of the security gate is opened in accordance with the passing-through start signal.

18. The non-transitory computer readable medium according to claim 13, wherein each mobile robot transmits a passing-through completion signal indicating that passing through the security gate has been completed,
wherein the security gate allows a first mobile robot and a second mobile robot to consecutively pass through the gate when the gate is being opened once when the passing-through reservation signal from the second mobile robot is received before the passing-through completion signal from the first mobile robot is received, and
wherein the security gate closes the gate before the second mobile robot passes through the gate after the first mobile robot has passed through the gate when the passing-through reservation signal from the second mobile robot is not received before the passing-through completion signal from the first mobile robot is received.

* * * * *